United States Patent
Tsutsumi et al.

(10) Patent No.: US 9,492,783 B2
(45) Date of Patent: Nov. 15, 2016

(54) CARBON DIOXIDE GAS RECOVERY DEVICE

(75) Inventors: Atsushi Tsutsumi, Tokyo (JP); Akira Kishimoto, Tokyo (JP); Yasuki Kansha, Tokyo (JP); Kazuki Murahashi, Tokyo (JP); Tomohiro Mimura, Tokyo (JP); Mikihiro Hayashi, Tokyo (JP); Yutaka Ekuni, Tokyo (JP)

(73) Assignees: NIPPON STEEL & SUMIKIN ENGINEERING CO., LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 450 days.

(21) Appl. No.: 13/638,066

(22) PCT Filed: Mar. 28, 2011

(86) PCT No.: PCT/JP2011/057549
§ 371 (c)(1),
(2), (4) Date: Nov. 20, 2012

(87) PCT Pub. No.: WO2011/122525
PCT Pub. Date: Oct. 6, 2011

(65) Prior Publication Data
US 2013/0055756 A1 Mar. 7, 2013

(30) Foreign Application Priority Data
Mar. 31, 2010 (JP) ................................. 2010-080237

(51) Int. Cl.
B01D 53/14 (2006.01)
C01B 31/20 (2006.01)

(52) U.S. Cl.
CPC ....... *B01D 53/1425* (2013.01); *B01D 53/1475* (2013.01); *C01B 31/20* (2013.01);
(Continued)

(58) Field of Classification Search
CPC .......... B01D 53/1425; B01D 53/1475; B01D 2258/0283; B01D 2259/65; C01B 31/20; Y02B 30/123; Y02B 30/52; Y02C 10/04; Y02C 10/06
See application file for complete search history.

(56) References Cited

U.S. PATENT DOCUMENTS 3,893,894 A * 7/1975 Humiston ..................... 202/235
4,167,402 A * 9/1979 Davis .............................. 62/630
(Continued)

FOREIGN PATENT DOCUMENTS

| JP | 62-197125 | 8/1987 |
| JP | 63-119833 | 5/1988 |

(Continued)

OTHER PUBLICATIONS

Office Action dated Feb. 25, 2014 issued in corresponding CA Application No. 2795028.
(Continued)

*Primary Examiner* — Amber R Orlando
*Assistant Examiner* — Britanny Precht
(74) *Attorney, Agent, or Firm* — Andrews Kurth Kenyon LLP

(57) ABSTRACT

A carbon dioxide gas recovery device is provided which includes an absorption tower causing an absorbent to absorb carbon dioxide gas to generate a rich absorbent and a regeneration tower regenerating a lean absorbent by heating the rich absorbent to separate carbon dioxide gas therefrom. The regeneration tower includes a reboiler system heating the absorbent led out from the regeneration tower and reintroducing the heated absorbent into the regeneration tower and a mixed gas cooling system cooling a mixed gas led out from the regeneration tower, condensing a vapor fraction of a solute and a solvent, reintroducing the condensed vapor fraction into the regeneration tower, and discharging carbon dioxide gas. The carbon dioxide gas recovery device further includes a heat pump as a heat source of an endothermic reaction in which carbon dioxide gas is separated from the rich absorbent in the regeneration tower.

11 Claims, 8 Drawing Sheets

(52) U.S. Cl.
CPC ... *B01D2258/0283* (2013.01); *B01D 2259/65* (2013.01); *Y02B 30/52* (2013.01); *Y02C 10/04* (2013.01); *Y02C 10/06* (2013.01); *Y02P 20/124* (2015.11); *Y02P 20/129* (2015.11); *Y02P 20/152* (2015.11)

(56) References Cited

U.S. PATENT DOCUMENTS

| | | | | |
|---|---|---|---|---|
| 4,184,855 | A | * | 1/1980 | Butwell et al. ............... 95/174 |
| 5,378,442 | A | * | 1/1995 | Fujii et al. .................. 423/228 |
| 5,510,567 | A | * | 4/1996 | Lermite et al. ............. 585/833 |
| 8,425,655 | B2 | * | 4/2013 | Chen et al. ..................... 95/16 |
| 8,701,764 | B2 | * | 4/2014 | Borseth et al. ........... 166/272.3 |
| 2003/0045756 | A1 | * | 3/2003 | Mimura et al. ............. 564/498 |
| 2004/0023086 | A1 | * | 2/2004 | Su et al. ........................ 429/17 |
| 2006/0032377 | A1 | * | 2/2006 | Reddy et al. .................. 96/234 |
| 2009/0151566 | A1 | * | 6/2009 | Handagama et al. .......... 95/187 |
| 2010/0104490 | A1 | * | 4/2010 | Bouillon et al. .............. 423/223 |
| 2011/0195004 | A1 | * | 8/2011 | Warner ......................... 423/220 |

FOREIGN PATENT DOCUMENTS

| | | |
|---|---|---|
| JP | 09-155141 | 6/1997 |
| JP | 2003-225537 | 8/2003 |
| WO | 2009/076328 | 6/2009 |
| WO | 2009/082200 | 7/2009 |

OTHER PUBLICATIONS

International Search Report dated Apr. 19, 2011, issued in corresponding PCT Application No. PCT/JP2011/057549.

* cited by examiner

CARBON DIOXIDE GAS RECOVERY DEVICE

TECHNICAL FIELD

The present invention relates to a carbon dioxide gas recovery device that recovers carbon dioxide gas through the use of a $CO_2$ chemical absorption and separation method.

This application is a national stage application of International Application No. PCT/JP2011/057549, filed Mar. 28, 2011, which claims priority to Japanese Patent Application No. 2010-080237, filed Mar. 31, 2010, the content of which is incorporated herein by reference.

BACKGROUND ART

Conventionally, for example, a constitution described in Patent Literature 1 has been known as a carbon dioxide gas recovery device. As shown in FIG. 8, a carbon dioxide gas recovery device 1000 includes an absorption tower 1001 that brings a carbon dioxide-containing gas containing carbon dioxide gas and a lean absorbent into contact with each other and causes the absorbent to absorb carbon dioxide gas in the carbon dioxide-containing gas to generate a rich absorbent, and a regeneration tower 1002 that regenerates the rich absorbent as a lean absorbent by heating the rich absorbent supplied from the absorption tower 1001 to separate carbon dioxide gas from the rich absorbent.

The regeneration tower 1002 includes a reboiler system 1003 that leads the lean absorbent from the regeneration tower 1002, heats the led lean absorbent, and reintroduces the resultant lean absorbent into the regeneration tower 1002, and a mixed gas cooling system 1004 that leads a mixed gas of carbon dioxide gas and a vapor fraction of a solute and a solvent (for example, water) of the absorbent from the regeneration tower 1002, cools the led mixed gas, condenses the vapor fraction of the solute and the solvent in the mixed gas, reintroduces the condensed vapor fraction into the regeneration tower 1002, and discharges a non-condensed carbon dioxide gas.

In the carbon dioxide gas recovery device 1000, the heat serving as a heat source for heating the rich absorbent in the regeneration tower 1002 is supplied through the absorbent heated by the reboiler system 1003 and reintroduced into the regeneration tower 1002. The reboiler system 1003 includes a reboiler body 1005 that heats the absorbent using externally-supplied heat as a heat source.

CITATION LIST

Patent Literature

[Patent Literature 1] Japanese Unexamined Patent Application, First Publication No. 2003-225537

SUMMARY OF THE INVENTION

Problems to be Solved by the Invention

In the carbon dioxide gas recovery device 1000, heat supplied from the reboiler body 1005 of the reboiler system 1003 is consumed mainly when heating and regenerating an absorbent in the regeneration tower 1002. The heat supplied from the reboiler body 1005 leaks to the outside when cooling the mixed gas in the mixed gas cooling system 1004 or when discharging carbon dioxide gas from the mixed gas cooling system 1004.

Here, in the carbon dioxide gas recovery device 1000, it is necessary to suppress an amount of heat input, which is input externally, to the reboiler system 1003 and to achieve an energy-saving effect.

The invention is made in consideration of the above-mentioned circumstances and an object thereof is to provide a carbon dioxide gas recovery device which can suppress the amount of heat input, which is input externally, and achieve an energy-saving effect.

Means for Solving the Problem

The invention provides the following means to achieve the above-mentioned object.

According to an aspect of the invention, there is provided a carbon dioxide gas recovery device including: an absorption tower that is configured to introduce a carbon dioxide-containing gas containing carbon dioxide gas and a lean absorbent, bring the carbon dioxide-containing gas and the lean absorbent into contact with each other, and cause the absorbent to absorb carbon dioxide gas in the carbon dioxide-containing gas to generate a rich absorbent; and a regeneration tower that is configured to regenerate the lean absorbent by heating the rich absorbent supplied from the absorption tower to separate carbon dioxide gas from the rich absorbent, wherein the regeneration tower includes: a reboiler system that is configured to lead the absorbent from the regeneration tower, heat the led absorbent, and reintroduce the resultant absorbent into the regeneration tower; and a mixed gas cooling system that is configured to lead a mixed gas of carbon dioxide gas and a vapor fraction of a solute and a solvent of the absorbent from the regeneration tower, cool the led mixed gas, condense the vapor fraction of the solute and the solvent, reintroduce the condensed vapor fraction into the regeneration tower, and discharge carbon dioxide gas, wherein the carbon dioxide gas recovery device further comprising a heat pump that is configured to use the heat, which is transmitted through a heat carrier medium generated in an exothermic reaction in which the absorbent absorbs carbon dioxide gas in the absorption tower, as a heat source of an endothermic reaction in which carbon dioxide gas is separated from the rich absorbent in the regeneration tower.

Here, an absorbent means a lean absorbent, a rich absorbent, or a mixed solution of a lean absorbent and a rich absorbent.

According to the aspect of the invention, since the carbon dioxide gas recovery device includes the heat pump, it is possible to use the heat generated in the exothermic reaction in the absorption tower as a heat source of the endothermic reaction in the regeneration tower. Since the heat generated in the exothermic reaction is the same as the heat used in the endothermic reaction, it is possible to cancel out the reaction heat through internal exchange. In the past, the heat required for a reaction was supplied from the outside and the heat generated from a reaction was wasted using cooling water. However, the emitted reaction heat wasted through water cooling or the like can be used as a heat source of an endothermic reaction required for regeneration and it is thus possible to suppress the amount of heat input, which is input externally, and to achieve an energy-saving effect.

The heat pump may further include a first heat exchanger that is embedded in an absorption tower filler disposed in the absorption tower, and is configured to exchange heat between the heat carrier medium lowered in temperature through expansion and the absorbent in the absorption tower.

In this case, since the heat pump includes the first heat exchanger, the heat generated in the exothermic reaction in the absorption tower can be transmitted to the heat carrier medium with a small loss and a high efficiency.

Accordingly, since the heat generated in the exothermic reaction in the absorption tower can be effectively used as a heat source of the endothermic reaction in the regeneration tower, it is possible to further achieve an energy-saving effect. In this case, since an absorption rate due to the fall in temperature of the absorbent is also improved, it is possible to achieve a further improvement in device efficiency.

The heat pump may include a second heat exchanger that is embedded in a regeneration tower filler disposed in the regeneration tower, and that is configured to exchange heat between the heat carrier medium raised in temperature through compression and the rich absorbent in the regeneration tower.

In this case, since the heat pump includes the second heat exchanger, the heat generated in the exothermic reaction and transmitted through the heat carrier medium can be used as a heat source of the endothermic reaction in the regeneration tower with a small loss and a high efficiency.

Accordingly, since the heat generated in the exothermic reaction in the absorption tower can be effectively used as a heat source of the endothermic reaction in the regeneration tower, it is possible to further achieve an energy-saving effect.

The absorption tower may include a lead channel that is configured to lead a decarbonated gas obtained by separating carbon dioxide gas from the carbon dioxide-containing gas, and a third heat exchanger that exchanges heat between the decarbonated gas and the heat carrier medium lowered in temperature through expansion may be interposed between the lead channel and the heat pump.

In this case, since the third heat exchanger is interposed between the lead channel and the heat pump, the heat of the decarbonated gas led out from the absorption tower can be transmitted to the heat carrier medium to heat the heat carrier medium by exchanging heat between the decarbonated gas in the lead channel and the heat carrier medium in the heat pump.

Accordingly, the heat generated in the exothermic reaction in the absorption tower and exchanged with the decarbonated gas can be prevented from leaking to the outside, thereby further achieving an energy-saving effect.

The absorption tower may include a decarbonated gas cleaning system that is configured to lead a cleaner stored in the tower top portion of the absorption tower from the absorption tower, cool the led cleaner, and reintroduce the cooled cleaner into the tower top portion of the absorption tower, and a fourth heat exchanger that exchanges heat between the cleaner and the heat carrier medium lowered in temperature through expansion may be interposed between the decarbonated gas cleaning system and the heat pump.

In this case, since the absorption tower includes the decarbonated gas cleaning system, the solute of the absorbent that accompanies the decarbonated gas can be prevented from leaking to the outside from the tower top portion of the absorption tower when the decarbonated gas obtained by separating carbon dioxide gas from the carbon dioxide-containing gas ascends in the absorption tower.

Since the fourth heat exchanger is interposed between the decarbonated gas cleaning system and the heat pump, it is possible to heat the heat carrier medium while cooling the cleaner by exchanging heat between the cleaner in the decarbonated gas cleaning system and the heat carrier medium in the heat pump.

Accordingly, the heat generated in the exothermic reaction in the absorption tower and exchanged with the cleaner can be prevented from leaking to the outside, thereby further achieving an energy-saving effect.

The carbon dioxide gas recovery device may further include a rich supply channel that is configured to supply the rich absorbent from the absorption tower to the regeneration tower, and a fifth heat exchanger that exchanges heat between the rich absorbent and the heat carrier medium lowered in temperature through expansion may be interposed between the rich supply channel and the heat pump.

In this case, since the fifth heat exchanger is interposed between the rich supply channel and the heat pump, the heat of the rich absorbent generated in the exothermic reaction of the absorption tower and exchanged with the rich absorbent can be transmitted to the heat carrier medium to heat the heat carrier medium by exchanging heat between the rich absorbent of the rich supply channel and the heat carrier medium of the heat pump.

When the carbon dioxide gas recovery device includes a lean supply channel supplying the lean absorbent from the regeneration tower to the absorption tower, an amine heat exchanger exchanging heat between the lean absorbent and the rich absorbent is interposed between the lean supply channel and the rich supply channel, and the fifth heat exchanger is located upstream from the amine heat exchanger in the rich supply channel, the rich absorbent passing through the amine heat exchanger can be cooled by the fifth heat exchanger. Accordingly, it is possible to increase the amount of heat exchanged between the rich absorbent in the rich supply channel and the lean absorbent in the lean supply channel through the use of the amine heat exchanger and to effectively cool the lean absorbent in the lean supply channel, thereby increasing the amount of recovered heat from the viewpoint of the regeneration tower. Therefore, for example, even when a lean amine cooler cooling the lean absorbent is disposed downstream from the amine heat exchanger in the lean supply channel and the lean absorbent to be supplied to the absorption tower is cooled in advance before the lean absorbent is supplied to the absorption tower, it is possible to reduce heat loss to the outside which is caused by the cooling of the lean amine cooler.

The absorption tower may include an intercooler system that is configured to lead the absorbent from a tower intermediate part between the tower top portion and the tower bottom portion of the absorption tower, cool the led absorbent, and reintroduce the cooled absorbent into the tower intermediate part, and a sixth heat exchanger that exchanges heat between the absorbent and the heat carrier medium lowered in temperature through expansion may be interposed between the intercooler system and the heat pump.

In this case, since the absorption tower includes the intercooler system, the absorbent of the tower intermediate part can be cooled and then reintroduced and it is thus possible to promote the absorption of carbon dioxide gas in the absorbent in the absorption tower.

Since the sixth heat exchanger is interposed between the intercooler system and the heat pump, it is possible to heat the heat carrier medium while cooling the absorbent by exchanging heat between the absorbent of the intercooler system and the heat carrier medium of the heat pump.

Accordingly, the heat generated in the exothermic reaction in the absorption tower and exchanged with the absorbent can be prevented from leaking to the outside, thereby further achieving an energy-saving effect.

The carbon dioxide gas recovery device may further include a lean supply channel that is configured to supply the lean absorbent from the regeneration tower to the absorption tower, and a seventh heat exchanger that exchanges heat between the lean absorbent and the heat carrier medium lowered in temperature through expansion may be interposed between the lean supply channel and the heat pump.

In this case, since the seventh heat exchanger is interposed between the lean supply channel and the heat pump, it is possible to heat the heat carrier medium while cooling the lean absorbent by exchanging heat between the lean absorbent of the lean supply channel and the heat carrier medium of the heat pump.

Accordingly, it is possible to cool the lean absorbent to be supplied to the absorption tower and thus to promote the absorption of carbon dioxide gas in the lean absorbent in the absorption tower.

An eighth heat exchanger that exchanges heat between the absorbent and the heat carrier medium raised in temperature through compression may be interposed between the reboiler system and the heat pump.

In this case, since the eighth heat exchanger is interposed between the reboiler system and the heat pump, the heat of the heat carrier medium can be transmitted to the absorbent to heat the absorbent by exchanging heat between the absorbent of the reboiler system and the heat carrier medium of the heat pump.

Accordingly, it is possible to further suppress the amount of heat input, which is input externally, to the reboiler system and thus to further achieve an energy-saving effect.

The carbon dioxide gas recovery device may further include a rich supply channel that is configured to supply the rich absorbent from the absorption tower to the regeneration tower, and a ninth heat exchanger that exchanges heat between the rich absorbent and the heat carrier medium raised in temperature through compression may be interposed between the rich supply channel and the heat pump.

In this case, since the ninth heat exchanger is interposed between the rich supply channel and the heat pump, the heat of the heat carrier medium can be transmitted to the rich absorbent to be supplied to the regeneration tower to heat the rich absorbent by exchanging heat between the rich absorbent of the rich supply channel and the heat carrier medium of the heat pump.

In this way, since the rich absorbent to be supplied to the regeneration tower can be preliminarily heated, it is possible to suppress the amount of heat to be transmitted to the rich absorbent in the regeneration tower. Accordingly, it is possible to further suppress the amount of heat input, which is input externally, to the reboiler system and thus to further achieve an energy-saving effect.

When the carbon dioxide gas recovery device includes a lean supply channel supplying the lean absorbent from the regeneration tower to the absorption tower and an amine heat exchanger exchanging heat between the lean absorbent and the rich absorbent is interposed between the lean supply channel and the rich supply channel, the amount of heat applied in the thirteenth heat exchanger is added to the amount of heat applied in the amine heat exchanger and thus the amount of heat preliminarily applied to the rich absorbent increases, thereby further suppressing the amount of heat to be applied to the absorbent from the reboiler system. Accordingly, it is possible to further suppress the amount of heat input, which is input externally, to the reboiler system and thus to further achieve an energy-saving effect.

The mixed gas cooling system may include a mixed gas compressor that is configured to compress the mixed gas to raise the temperature of the mixed gas and obtain a temperature-raised mixed gas, and a tenth heat exchanger that exchanges heat between the absorbent and the temperature-raised mixed gas may be interposed between the reboiler system and the mixed gas cooling system.

In this case, since the mixed gas cooling system includes the mixed gas compressor, the temperature-raised mixed gas is obtained without applying external heat by applying a small amount of external power thereto. Since the tenth heat exchanger is interposed between the reboiler system and the mixed gas cooling system, it is possible to cool the temperature-raised mixed gas while heating the absorbent by exchanging heat between the absorbent of the reboiler system and the temperature-raised mixed gas of the mixed gas cooling system.

Accordingly, it is possible to further suppress the amount of heat input, which is input externally, to the reboiler system and thus to effectively further achieve an energy-saving effect.

The carbon dioxide gas recovery device may further include a rich supply channel that is configured to supply the rich absorbent from the absorption tower to the regeneration tower, and an eleventh heat exchanger that exchanges heat between the temperature-raised mixed gas after passing through the tenth heat exchanger and the rich absorbent may be interposed between the mixed gas cooling system and the rich supply channel.

In this case, since the eleventh heat exchanger is interposed between the mixed gas cooling system and the rich supply channel, it is possible to cool the temperature-raised mixed gas while heating the rich absorbent to be supplied to the regeneration tower by exchanging heat between the temperature-raised mixed gas of the mixed gas cooling system and the rich absorbent of the rich supply channel.

In this way, since the rich absorbent to be supplied to the regeneration tower can be preliminarily heated with the heat of the mixed gas discharged from the regeneration tower, it is possible to suppress the amount of heat to be transmitted to the rich absorbent in the regeneration tower. Accordingly, it is possible to further suppress the amount of heat input, which is input externally, to the reboiler system and thus to further achieve an energy-saving effect.

Since the temperature-raised mixed gas of the mixed gas cooling system passes through the tenth heat exchanger and then passes through the eleventh heat exchanger, for example, the latent heat of the vapor fraction of the solute and the solvent in the temperature-raised mixed gas can be recovered by the tenth heat exchanger and then the sensible heat of the residual temperature-raised mixed gas including the non-condensed vapor fraction of the solute and the solvent and carbon dioxide gas and the remaining latent heat can be recovered by the eleventh heat exchanger.

The carbon dioxide gas recovery device may further include a rich supply channel that is configured to supply the rich absorbent from the absorption tower to the regeneration tower, the mixed gas cooling system may include a mixed gas compressor that is configured to compress the mixed gas to raise the temperature of the mixed gas and obtain a temperature-raised mixed gas, and a twelfth heat exchanger that exchanges heat between the temperature-raised mixed gas and the rich absorbent may be interposed between the mixed gas cooling system and the rich supply channel.

In this case, since the mixed gas cooling system includes the mixed gas compressor, the temperature-raised mixed gas is obtained without applying external heat by applying a small amount of external power thereto. Since the twelfth heat exchanger is interposed between the mixed gas cooling system and the rich supply channel, it is possible to cool the temperature-raised mixed gas while heating the rich absorbent to be supplied to the regeneration tower by exchanging heat between the temperature-raised mixed gas of the mixed gas cooling system and the rich absorbent of the rich supply channel.

In this way, since the rich absorbent to be supplied to the regeneration tower can be preliminarily heated with the heat of the mixed gas discharged from the regeneration tower, it is possible to suppress the amount of heat to be transmitted to the rich absorbent in the regeneration tower. Accordingly, it is possible to satisfactorily suppress the amount of heat input, which is input externally, to the reboiler system and thus to effectively achieve an energy-saving effect.

A thirteenth heat exchanger that exchanges heat between the temperature-raised mixed gas after passing through the twelfth heat exchanger and the rich absorbent may be interposed between the mixed gas cooling system and the rich supply channel.

In this case, since the twelfth heat exchanger and the thirteenth heat exchanger are interposed between the mixed gas cooling system and the rich supply channel, it is possible to effectively preliminarily heat the rich absorbent to be supplied to the regeneration tower with the heat of the mixed gas discharged from the regeneration tower and thus to suppress the amount of heat to be transmitted to the rich absorbent in the regeneration tower. Accordingly, it is possible to further suppress the amount of heat input, which is input externally, to the reboiler system and thus to further achieve an energy-saving effect.

Since the temperature-raised mixed gas of the mixed gas cooling system passes through the twelfth heat exchanger and then passes through the thirteenth heat exchanger, for example, the latent heat of the vapor fraction of the solute and the solvent in the temperature-raised mixed gas can be recovered by the twelfth heat exchanger and then the sensible heat of the residual temperature-raised mixed gas including the non-condensed vapor fraction of the solute and the solvent and carbon dioxide gas and the other latent heat can be recovered by the thirteenth heat exchanger.

Advantageous Effects of Invention

In the carbon dioxide gas recovery device according to the invention, it is possible to suppress an amount of heat input, which is input externally, and thus to achieve an energy-saving effect.

BEST MODE FOR CARRYING OUT THE INVENTION (First Embodiment)

Hereinafter, a carbon dioxide gas recovery device according to a first embodiment of the invention will be described with reference to the accompanying drawings. The carbon dioxide gas recovery device recovers carbon dioxide gas by absorbing and separating carbon dioxide gas from a carbon dioxide-containing gas containing carbon dioxide gas through the use of a $CO_2$ chemical absorption and separation method and generates a decarbonated gas obtained by separating carbon dioxide gas from the carbon dioxide-containing gas. An absorbent capable of absorbing carbon dioxide gas is used in the $CO_2$ chemical absorption and separation method. An example of the absorbent is an amine absorbent which includes monoethanolamine (MEA), diethanolamine (DEA) or the like as a solute and water as a solvent.

In this embodiment, as described below, it is possible to achieve an energy-saving effect of the carbon dioxide gas recovery device through so-called self-heat recuperation.

Figure 1:
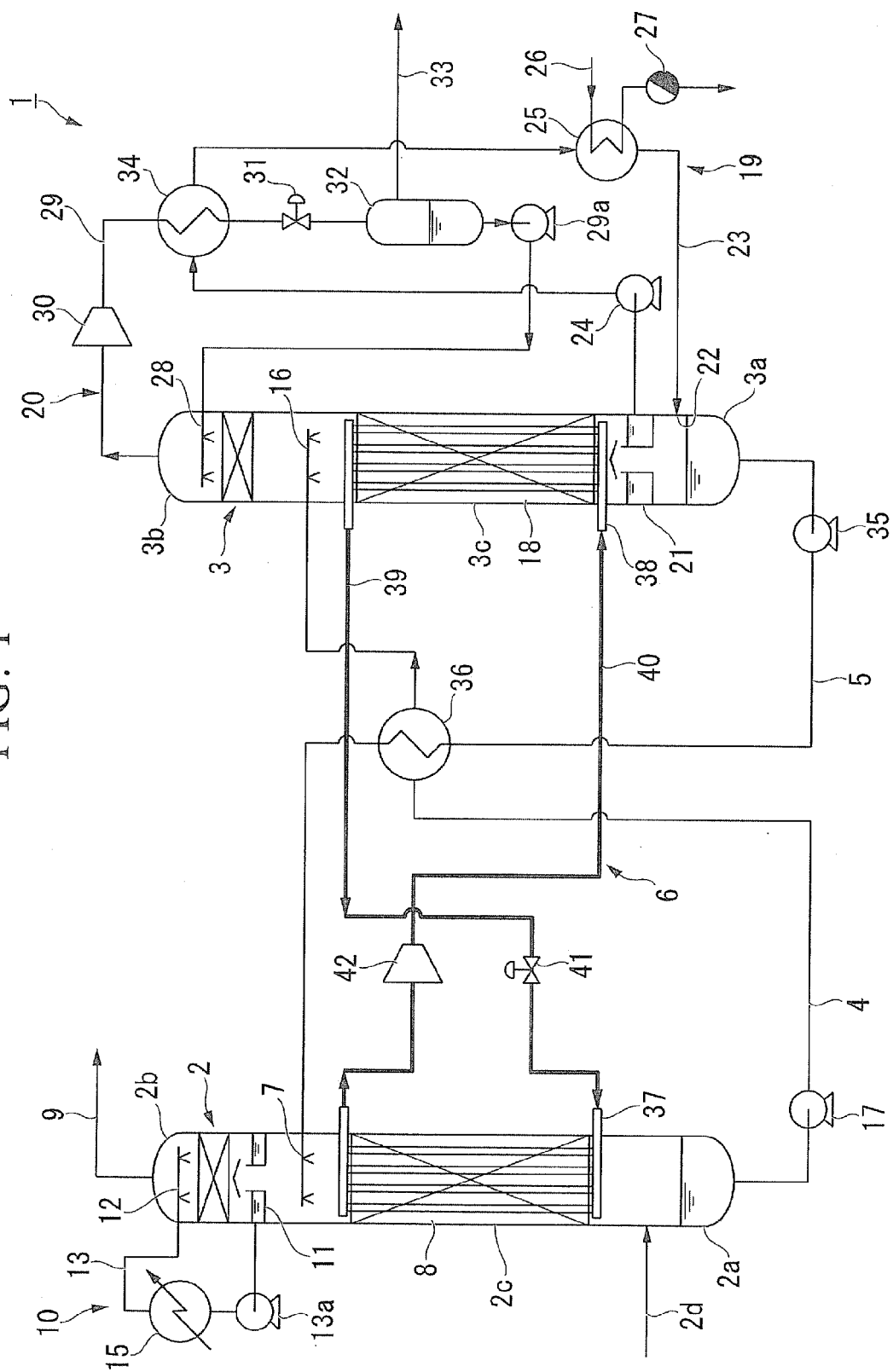
FIG. 1 is a diagram schematically illustrating a carbon dioxide gas recovery device according to a first embodiment of the invention.

As shown in FIG. 1, the carbon dioxide gas recovery device 1 includes an absorption tower 2, a regeneration tower 3, a rich supply channel 4, a lean supply channel 5, and a heat pump 6. The absorption tower 2 brings a carbon dioxide-containing gas and a lean absorbent capable of absorbing carbon dioxide gas into contact with each other and causes the lean absorbent to absorb carbon dioxide gas in the carbon dioxide-containing gas to generate a rich absorbent. The regeneration tower 3 regenerates the lean absorbent by heating the rich absorbent supplied from the absorption tower 2 to separate carbon dioxide gas from the rich absorbent. The rich supply channel 4 supplies the rich absorbent from the absorption tower 2 to the regeneration tower 3. The lean supply channel 5 supplies the lean absorbent from the regeneration tower 3 to the absorption tower 2. The heat pump 6 transmits heat generated in an exothermic reaction in which the lean absorbent absorbs carbon dioxide gas in the absorption tower 2 through a heat carrier medium and uses the transmitted heat as a heat source of an endothermic reaction in which carbon dioxide gas is separated from the rich absorbent in the regeneration tower 3.

A tower bottom portion 2a of the absorption tower 2 is provided with an introduction channel 2d used to introduce the carbon dioxide-containing gas. A first nozzle 7 supplying the lean absorbent to the inside of the tower and to a downward direction is disposed in a tower top portion 2b of the absorption tower 2. An absorption tower filler 8 bringing the lean absorbent and the carbon dioxide-containing gas into contact with each other on the surface thereof is disposed in a tower intermediate part 2c between the tower top portion 2b and the tower bottom portion 2c in the absorption tower 2.

The absorption tower 2 includes a lead channel 9 leading a decarbonated gas from the tower top portion 2b of the absorption tower 2, and a decarbonated gas cleaning system 10 leading a cleaner (cleaning liquid) stored in the tower top portion 2b of the absorption tower 2 from the absorption tower 2, cooling the led cleaner (cleaning liquid), and reintroducing the cooled cleaner into the tower top portion 2b of the absorption tower 2.

The decarbonated gas cleaning system 10 includes a liquid-receiving tray 11 being disposed above the first nozzle 7 and storing a cleaner, a second nozzle 12 being disposed above the liquid-receiving tray 11 and supplying the cleaner to a downward direction, and a pipe 13 connecting the liquid-receiving tray 11 and the second nozzle 12.

The pipe 13 is provided with a cleaner circulating pump 13a supplying the cleaner from the liquid-receiving tray 11 to the second nozzle 12 through the pipe 13 and a water-cooling cleaner cooler 15 cooling the cleaner downstream from the cleaner circulating pump 13a.

The cleaner is preferably the same material as the solute (for example, water) of the absorbent. Here, an absorbent means a lean absorbent, or a rich absorbent, or a mixed solution of the lean absorbent and the rich absorbent.

The rich supply channel 4 connects the tower bottom portion 2a of the absorption tower 2 to a third nozzle 16 being disposed in the tower top portion 3b of the regeneration tower 3 and supplying the rich absorbent to a downward direction. The rich supply channel 4 is provided with an absorption tower bottom pump 17 transferring the rich absorbent from the tower bottom portion 2a of the absorption tower 2 to the third nozzle 16 through the rich supply channel 4.

A regeneration tower filler 18 is disposed in the tower intermediate part 3c between the tower top portion 3b and the tower bottom portion 3a in the regeneration tower 3. The absorbent flowing down along the surface of the regeneration tower filler 18 comes into gas-liquid contact with the vapor fraction of the solute and the solvent (for example, water) ascending in the regeneration tower 3 or the mixed gas of the vapor fraction and carbon dioxide gas.

The regeneration tower 3 includes a reboiler system 19 leading an absorbent from the regeneration tower 3, heating the absorbent, and reintroducing the heated absorbent into the regeneration tower 3 and a mixed gas cooling system 20 leading the mixed gas from the regeneration tower 3, cooling the led mixed gas, condensing the vapor fraction of the solute and the solvent, reintroducing the condensate into the regeneration tower 3, and discharging the non-condensed carbon dioxide gas.

The reboiler system 19 heats the absorbent and then reintroduces the heated absorbent into the tower bottom portion 3a of the regeneration tower 3.

At this time, a part of the heated absorbent is flashed and a part of each of the solute and the solvent of the absorbent becomes vapor. The reboiler system 19 includes a liquid-receiving tray 21 being disposed in the tower bottom portion 3a of the regeneration tower 3 and storing an absorbent, and a pipe 23 connecting the liquid-receiving tray 21 to a vapor generation part 22 located below the liquid-receiving tray 21 in the tower bottom portion 3a.

The pipe 23 is provided with a reboiler pump 24 and a reboiler body 25. The reboiler pump 24 transfers the absorbent from the liquid-receiving tray 21 to the vapor generating part 22 through the pipe 23. The reboiler body 25 heats the absorbent downstream from the reboiler pump 24 using the heat supplied from the outside as a heat source.

In the example shown in the drawing, the reboiler body 25 is constructed by a heat exchanger exchanging heat between the reboiler system 19 and a reboiler pipe 26 through which a high-temperature fluid (for example, saturated vapor) supplied externally. The reboiler pipe 26 is provided with a steam trap 27 downstream from the reboiler body 25.

The mixed gas cooling system 20 includes a fourth nozzle 28 being disposed above the third nozzle 16 and supplying a condensate, which is the vapor fraction of the solute and the solvent, to a downward direction, and a pipe 29 connecting the tower top of the regeneration tower 3 to the fourth nozzle 28.

In the pipe 29, a mixed gas compressor 30, a decompression and expansion valve 31, a gas-liquid separator 32, and a condensate circulating pump 29a are arranged in this order from the tower top of the regeneration tower 3 to the fourth nozzle 28. The mixed gas compressor 30 compresses the mixed gas to raise the temperature thereof and produces a temperature-raised mixed gas. The decompression and expansion valve 31 expands the temperature-raised mixed gas to lower the temperature thereof. The gas-liquid separator 32 separates the condensate and carbon dioxide gas. The condensate circulating pump 29a transfers the condensate from the gas-liquid separator 32 to the fourth nozzle 28 through the pipe 29.

The gas-liquid separator 32 is provided with a discharge channel 33 discharging carbon dioxide gas separated from the mixed gas by the gas-liquid separator 32.

In this embodiment, a condensing heat exchanger (the tenth heat exchanger) 34 exchanging heat between the absorbent and the temperature-raised mixed gas is interposed between the reboiler system 19 and the mixed gas cooling system 20.

In the example shown in the drawing, the absorbent before being heated by the reboiler body 25 passes through the condensing heat exchanger 34. The condensing heat exchanger 34 is interposed between the reboiler pump 24 and the reboiler body 25 in the pipe 23 of the reboiler system 19 and is interposed between the mixed gas compressor 30 and the decompression and expansion valve 31 in the pipe 29 of the mixed gas cooling system 20.

The lean supply channel 5 connecting the tower bottom portion 3a of the regeneration tower 3 and the first nozzle 7 in the absorption tower 2 to each other. The lean supply channel 5 is provided with a regeneration tower bottom pump 35 transferring the lean absorbent from the tower bottom portion 3a of the regeneration tower 3 to the first nozzle 7 through the lean supply channel 5.

An amine heat exchanger 36 exchanging heat between the lean absorbent and the rich absorbent is interposed between the lean supply channel 5 and the rich supply channel 4.

The heat pump 6 includes an absorption-tower internal heat exchanger (the first heat exchanger) 37 embedded in the absorption tower filler 8 in the absorption tower 2, a regeneration-tower internal heat exchanger (the second heat exchanger) 38 embedded in the regeneration tower filler 18 in the regeneration tower 3, and a pair of pipes 39 and 40 connecting the absorption-tower internal heat exchanger 37 and the regeneration-tower internal heat exchanger 38.

The absorption-tower internal heat exchanger 37 is disposed to longitudinally cross the absorption tower filler 8 and exchanges heat between the heat carrier medium lowered in temperature through expansion and the absorbent in the absorption tower 2.

The regeneration-tower internal heat exchanger 38 is disposed to longitudinally cross the regeneration tower filler 18 and exchanges heat between the heat carrier medium raised in temperature through compression and the absorbent in the regeneration tower 3.

Among a pair of pipes 39 and 40, one pipe 39 connects the top of the regeneration-tower internal heat exchanger 38 and the bottom of the absorption-tower internal heat exchanger 37 to each other. The pipe 39 is provided with a heat-carrier expansion valve 41 expanding the heat carrier medium to lower the temperature thereof. The other pipe 40 connects the top of the absorption-tower internal heat exchanger 37 and the bottom of the regeneration-tower internal heat exchanger 38 to each other. The pipe 40 is provided with a heat carrier compressor 42 compressing the heat carrier medium to raise the temperature thereof.

The heat carrier medium is preferably a fluid capable of recovering the heat generated in the exothermic reaction in the absorption tower 2 as latent heat of vaporization through the vaporization in the absorption-tower internal heat exchanger 37, generating heat of condensation through condensation in the regeneration-tower internal heat exchanger 38, and using the heat of condensation as a heat source of the endothermic reaction in the regeneration tower 3. Examples of the fluid include pentane, water and so on.

The operation of the carbon dioxide gas recovery device 1 having the above-described configuration will be described below.

First, the flow of the absorbent will be described using the absorption tower 2 as a start point.

In the absorption tower 2, the carbon dioxide-containing gas supplied to the tower bottom portion 2a ascends therein and the lean absorbent supplied from the first nozzle 7 in the tower top portion 2b descends therein. In this process, the carbon dioxide-containing gas and the lean absorbent come in contact with each other and carbon dioxide gas in the carbon dioxide-containing gas is absorbed in the lean absorbent to cause an exothermic reaction.

In this embodiment, the absorption tower filler 8 is disposed in the tower intermediate part 2c of the absorption tower 2. This absorption tower filler 8 has, for example, a fin configuration having plural small gaps and has a large fin surface area per volume. The gaps are configured to regularly change the angle of a flow channel to intentionally cause a disturbance of the flow. On the surface of the absorption tower filler 8, the absorbent forms a wetted wall on a fin, flows down, and comes into gas-liquid contact with the carbon dioxide-containing gas ascending in the absorption tower 2. The absorption tower filler 8 has a structure in which the gaps between the wet walls are small and the progressing angle varies at a constant pitch to disturb the flow of gas and liquid and to validate the gas-liquid contact. Accordingly, on the surface of the absorption tower filler 8, the ascending carbon dioxide-containing gas easily comes in contact with the descending absorbent and thus the absorption of carbon dioxide gas in the absorbent is promoted.

Accordingly, the rich absorbent and the decarbonated gas are produced. The decarbonated gas ascends to the tower top portion 2b of the absorption tower 2 and is led to the outside through the lead channel 9.

In this embodiment, since the decarbonated gas cleaning system 10 is disposed in the absorption tower 2, it is possible to cool the inside of the tower top portion 2b of the absorption tower 2 by the use of the cleaner cooled and reintroduced by the water-cooling cleaner cooler 15. Accordingly, for example, even when the solute in the absorbent is scattered or vaporized and ascends with the decarbonated gas, the solute is supplied to the decarbonated gas cleaning system 10 before reaching the lead channel 9. Accordingly, the solute of the absorbent can be prevented from flowing out from the tower top portion 2b of the absorption tower 2 through the lead channel 9.

On the other hand, the rich absorbent produced along with the decarbonated gas descends in the absorption tower 2, is stored in the tower bottom portion 2a, and is supplied to the third nozzle 16 in the tower top portion 3b of the regeneration tower 3 through the rich supply channel 4. In this embodiment, the amine heat exchanger 36 is interposed between the lean supply channel 5 and the rich supply channel 4 and the rich absorbent is heated while cooling the lean absorbent by exchanging heat with the lean absorbent of the lean supply channel 5.

In the regeneration tower 3, the rich absorbent supplied from the third nozzle 16 descends and the absorbent heated by the reboiler system 19 is reintroduced into the tower bottom portion 3a. At this time, a part of the heated absorbent is flashed in the vapor generating part 22 and a part of each of the solute and the solvent of the absorbent becomes vapor and the regenerated carbon dioxide gas, which ascend in the regeneration tower 3. In this process, the rich absorbent and the vapor fraction of the solute and the solvent come in contact with each other and an exothermic reaction of separation and regeneration occurs using the heat of condensation of the vapor fraction of the solute and the solvent, whereby carbon dioxide gas is separated from the rich absorbent.

In this embodiment, the regeneration tower filler 18 is disposed in the tower intermediate part 3c of the regeneration tower 3. This regeneration tower filler 18 has, for example, a fin configuration having plural small gaps and has a large fin surface area per volume. The gaps are configured to regularly change the angle of a flow channel to intentionally cause a disturbance of the flow. On the surface of the regeneration tower filler 18, the absorbent forms a wet wall on a fin, flows down, and comes in contact with the vapor fraction of the solute and the solvent ascending in the regeneration tower 3. Accordingly, the gas-liquid contact is efficiently achieved due to the surface area or the disturbance of the flow and the separation and scattering of carbon dioxide is promoted.

Accordingly, the rich absorbent is separated into the lean absorbent and carbon dioxide gas. Among these, carbon dioxide gas is mixed with the vapor fraction of the solute and the solvent to form a mixed gas, which ascends in the regeneration tower 3.

The mixed gas is introduced into the pipe 29 of the mixed gas cooling system 20 from the tower top of the regeneration tower 3, is compressed by the mixed gas compressor 30 in the process of passing through the pipe 29 to raise the temperature thereof, and becomes the temperature-raised mixed gas. Thereafter, the temperature-raised mixed gas is cooled while heating the absorbent by exchanging heat with the absorbent of the reboiler system 19 through the use of the condensing heat exchanger 34. Thereafter, the temperature-raised mixed gas is expanded by the decompression and expansion valve 31 and is lowered in temperature.

In this way, the vapor fraction of the solute and the solvent in the temperature-raised mixed gas is condensed into a condensate and the condensate and the non-condensed carbon dioxide main gas (the temperature-raised mixed gas) having carbon dioxide gas as a main component are separated by the gas-liquid separator 32. The condensate is reintroduced into the regeneration tower 3 from the fourth nozzle 28 and the non-condensed carbon dioxide gas is discharged through the discharge channel 33.

On the other hand, the absorbent descending in the regeneration tower 3 is stored in the tower bottom portion 3a, is led as the separated and regenerated lean absorbent from the tower bottom portion 3a, and is supplied to the first nozzle 7 in the tower top portion 2b of the absorption tower 2 through the lean supply channel 5. At this time, the lean absorbent is cooled while preliminarily heating the rich absorbent by exchanging heat with the rich absorbent of the rich supply channel 4 through the use of the amine heat exchanger 36. Accordingly, from the viewpoint of the regeneration tower 3, the heat taken out by the lean absorbent can be recovered as the preliminary heat of the rich absorbent supplied from the outside.

The flow of the heat carrier medium in the heat pump 6 will be described with the heat carrier expansion valve 41 as a start point.

The heat carrier medium lowered in temperature by the heat carrier expansion valve 41 receives the heat generated in the exothermic reaction in which the absorbent chemically absorbs carbon dioxide and is vaporized into a gas while cooling the absorbent, by exchanging the heat with the absorbent while moving from the bottom to the top of the absorption-tower internal heat exchanger 37 after passing through one pipe 39. Thereafter, the heat carrier medium moves to the bottom portion of the regeneration-tower internal heat exchanger 38 through the pipe 40. At this time, the heat carrier medium is compressed to rise in temperature by the heat carrier compressor 42.

While moving from the bottom to the top of the regeneration-tower internal heat exchanger 38, the heat carrier medium heats the absorbent by exchanging the heat with the absorbent and is cooled and condensed by consuming the heat as the heat source of the endothermic reaction. Thereafter, the heat carrier medium moves to the bottom of the absorption-tower internal heat exchanger 37 through one pipe 39. At this time, the heat carrier medium is lowered in pressure and lowered in temperature to become a gas-liquid mixed fluid by the heat carrier expansion valve 41.

As described above, since the carbon dioxide gas recovery device 1 according to this embodiment includes the heat pump 6, it is possible to use the heat generated in the exothermic reaction in the absorption tower 2 as a heat source of the endothermic reaction in the regeneration tower 3. Since the heat generated in the exothermic reaction is equal to the heat of the endothermic reaction, the reaction heat can be cancelled through internal exchange. In the past, heat required for an endothermic reaction was supplied from the outside and heat generated from an exothermic reaction was wasted using cooling water. However, the emitted reaction heat wasted through the water cooling or the like can be used as a heat source of an endothermic reaction required for regeneration. As a result, it is possible to suppress an amount of heat input, which is input externally, and to achieve an energy-saving effect.

Since the heat pump 6 includes the absorption-tower internal heat exchanger 37, the heat generated in the exothermic reaction in the absorption tower 2 can be transmitted to the heat carrier medium with a small loss and a high efficiency.

Since the heat pump 6 includes the regeneration-tower internal heat exchanger 38, the heat generated in the exothermic reaction and transmitted through the heat carrier medium can be used as the heat source of the endothermic reaction in the regeneration tower 3 with a small loss and a high efficiency.

As described above, the heat generated in the exothermic reaction in which the absorbent chemically absorbs carbon dioxide in the absorption tower 2 can be effectively used as the heat source of the endothermic reaction in which carbon dioxide is separated from the absorbent in the regeneration tower 3 without consuming energy which was externally supplied and which was wasted using the cooling water, thereby further achieving an energy-saving effect.

The mixed gas cooling system 20 includes the mixed gas compressor 30. Accordingly, it is possible to obtain the temperature-raised mixed gas without externally supplying heat by applying a small amount of external power. The condensing heat exchanger 34 is interposed between the reboiler system 19 and the mixed gas cooling system 20. Accordingly, by exchanging heat between the absorbent of the reboiler system 19 and the temperature-raised mixed gas of the mixed gas cooling system 20, it is possible to cool the temperature-raised mixed gas while heating the absorbent.

In this way, the rich absorbent to be supplied to the regeneration tower 3 can be preliminarily heated with the heat of the mixed gas flowing out of the regeneration tower 3. As a result, it is possible to surely suppress the amount of heat input, which is input externally, to the reboiler system 19 and thus to effectively achieve an energy-saving effect.

The above-mentioned advantages can be generalized in the following two effects.

(1) Self-Heat Recuperation Effect of Reaction Heat

The amount of heat emitted in the reaction in the absorption tower 2 is equal to the amount of heat absorbed in the reaction in the regeneration tower 3. Accordingly, the reaction heat which was externally supplied in the past can be internally supplied through internal exchange of heat with a small amount of power required for the heat pump 6 and thus the exchange of heat with the outside can be made to be unnecessary. As a result, the amount of external heat which was added to the reboiler system 19 of the regeneration tower 3 is reduced in comparison with the conventional case.

(2) Self-Heat Recuperation of Latent Heat Required for Operating Tower

The amount of heat of the mixed gas flowing out from the tower top portion 3b of the regeneration tower 3 is equal to the amount of heat obtained by subtracting the amount of heat absorbed in the reaction for regeneration of the absorbent from the amount of heat externally supplied by the reboiler system 19 and consumed in vaporizing the solute and solvent of the absorbent. Accordingly, when the temperature-raised mixed gas can be obtained with a small amount of power for compressing the mixed gas and the heat of the mixed gas can be transmitted to the reboiler system 19 through the use of the condensing heat exchanger 34, the amount of heat to be externally supplied by the reboiler system 19 is reduced. More strictly speaking, the amount of heat to be supplied is an amount of heat matched with the sum of the amount of recovery leakage heat (the difference between the amount of sensible heat of the lean absorbent flowing out from the amine heat exchanger 36 and the amount of sensible heat of the rich absorbent flowing in the amine heat exchanger 36) in the amine heat exchanger 36 and the amount of heat emitted from the circumference of the regeneration tower 3.

(Second Embodiment)

A carbon dioxide gas recovery device according to a second embodiment of the invention will be described below.

In the second embodiment, the same elements as in the first embodiment are referenced by the same reference signs, description thereof will not be repeated, and only different points will be described.

Figure 2:
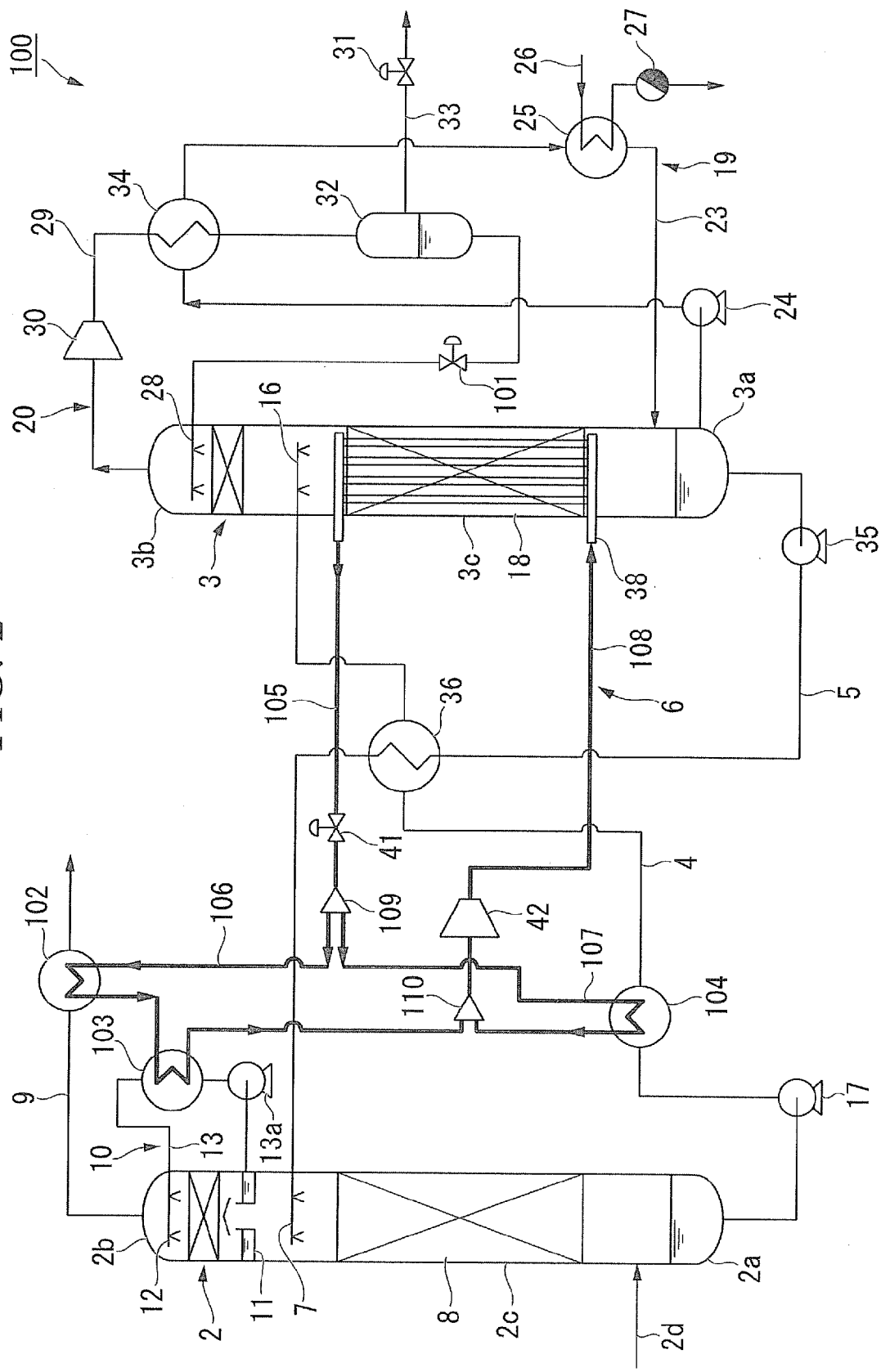
FIG. 2 is a diagram schematically illustrating a carbon dioxide gas recovery device according to a second embodiment of the invention.

As shown in FIG. 2, in the carbon dioxide gas recovery device 100 according to this embodiment, the decompression and expansion valve 31 of the mixed gas cooling system 20 is disposed in the discharge channel 33, and a level adjusting valve 101 instead of the condensate circulating pump 29a is disposed between the gas-liquid separator 32 and the fourth nozzle 28 in the pipe 29 of the mixed gas cooling system 20.

The heat pump 6 does not include the absorption-tower internal heat exchanger 37. In this embodiment, a decarbonated gas cooler (the third heat exchanger) 102 exchanging heat between the decarbonated gas and the heat carrier medium lowered in temperature through expansion is interposed between the lead channel 9 and the heat pump 6. A cleaner cooler (the fourth heat exchanger) 103 exchanging heat between the cleaner and the heat carrier medium lowered in temperature through expansion is interposed between the decarbonated gas cleaning system 10 and the heat pump 6. A rich amine heat exchanger (the fifth heat exchanger) 104 exchanging heat between the rich absorbent and the heat carrier medium lowered in temperature through expansion is interposed between the rich supply channel 4 and the heat pump 6.

The decarbonated gas cooler 102, the cleaner cooler 103, and the rich amine heat exchanger 104 are disposed on the heat recovery side through which the heat carrier medium expanded to fall in temperature by the heat carrier expansion valve 41 passes in the heat pump 6 and in which the heat carrier medium receives heat.

In the example shown in the drawing, the heat pump 6 includes plural pipes 105, 106, 107, and 108 and a heat carrier distributor 109 and a heat carrier collector 110 connecting the pipes 105, 106, 107, and 108. The plural pipes 105, 106, 107, and 108 include a first pipe 105 connecting the top of the regeneration-tower internal heat exchanger 38 and the heat carrier distributor 109, two branch pipes 106 and 107 connecting the heat carrier distributor 109 and the heat carrier collector 110, and a second pipe 108 connecting the heat carrier collector 110 and the bottom of the regeneration-tower internal heat exchanger 38.

Among the two branch pipes 106 and 107, the decarbonated gas cooler 102 and the cleaner cooler 103 are arranged in this order in one branch pipe 106 from the heat carrier distributor 109 to the heat carrier collector 110, and the rich amine heat exchanger 104 is disposed in the other branch pipe 107. The first pipe 105 is provided with the heat carrier expansion valve 41 and the second pipe 108 is provided with the heat carrier compressor 42.

In the example shown in the drawing, in the decarbonated gas cleaning system 10 disposed in the absorption tower 2, the cleaner cooler 103 is interposed between the cleaner circulating pump 13a and the second nozzle 12 in the pipe 13, but the water-cooling cleaner cooler 15 is not disposed.

In the rich supply channel 4, the rich amine heat exchanger 104 is disposed downstream the absorption tower bottom pump 17 and upstream from the amine heat exchanger 36.

The operation of the carbon dioxide gas recovery device 100 having the above-mentioned configuration will be described below. Here, the flow of the heat carrier medium in the heat pump 6 will be described with the heat carrier expansion valve 41 as a start point.

The heat carrier medium lowered in temperature by the heat carrier expansion valve 41 passes through the first pipe 105 and then passes through the two branch pipes 106 and 107 branched from the heat carrier distributor 109.

Among these, the heat carrier medium passing through one branch pipe 106 is heated by receiving the heat of the decarbonated gas led from the absorption tower 2 by exchanging heat with the decarbonated gas of the lead channel 9 in the decarbonated gas cooler 102. Thereafter, the heat carrier medium is further heated while cooling the cleaner by exchanging heat with the cleaner of the decarbonated gas cleaning system 10 in the cleaner cooler 103.

The heat carrier medium passing through the other branch pipe 107 is heated by receiving the heat of the rich absorbent flowing out from the absorption tower 2 in the rich amine heat exchanger 104.

The heat carrier media passing through both branch pipes 106 and 107 are merged in the heat carrier collector 110. The heat carrier media merged in the heat carrier collector 110 moves down to the bottom of the regeneration-tower internal heat exchanger 38 through the second pipe 108. At this time, the temperature of the heat carrier medium is raised in temperature by the heat carrier compressor 42. The heat carrier medium is cooled by exchanging heat with the absorbent while moving from the bottom to the top of the regeneration-tower internal heat exchanger 38 and heating the absorbent to consume the heat as the heat source of the endothermic reaction, and then moves to the heat carrier distributor 109 through the first pipe 105. At this time, the temperature of the heat carrier medium is lowered again by the heat carrier expansion valve 41.

As described above, in the carbon dioxide gas recovery device 100 according to this embodiment, the decarbonated gas cooler 102 is interposed between the lead channel 9 and the heat pump 6. Accordingly, by exchanging heat between the decarbonated gas of the lead channel 9 and the heat carrier medium of the heat pump 6, the heat of the decarbonated gas led from the absorption tower 2 can be transmitted to the heat carrier medium to heat the heat carrier medium.

Accordingly, the heat generated in the exothermic reaction in the absorption tower 2 and exchanged with the decarbonated gas can be prevented from leaking to the outside, thereby further achieving an energy-saving effect.

Since the cleaner cooler 103 is interposed between the decarbonated gas cleaning system 10 and the heat pump 6, it is possible to heat the heat carrier medium while cooling the cleaner by exchanging heat between the cleaner of the decarbonated gas cleaning system 10 and the heat carrier medium of the heat pump 6.

Accordingly, the heat generated in the exothermic reaction in the absorption tower 2 and exchanged between the decarbonated gas and the cleaner can be prevented from leaking to the outside, thereby further achieving an energy-saving effect.

The rich amine heat exchanger 104 is interposed between the rich supply channel 4 and the heat pump 6. Accordingly, by exchanging heat between the rich absorbent of the rich supply channel 4 and the heat carrier medium of the heat pump 6, the heat of the rich absorbent generated in the exothermic reaction in the absorption tower 2 and exchanged with the rich absorbent can be transmitted to the heat carrier medium to heat the heat carrier medium.

In this embodiment, since the rich amine heat exchanger 104 is disposed upstream from the amine heat exchanger 36 in the rich supply channel 4, the rich absorbent passing through the amine heat exchanger 36 can be cooled by the rich amine heat exchanger 104. Accordingly, since the amount of heat between the rich absorbent of the rich supply channel 4 and the lean absorbent of the lean supply channel 5 can be increased in the amine heat exchanger 36, it is possible to effectively cool the lean absorbent of the lean supply channel 5 and to increase the amount of heat recovered from the viewpoint of the regeneration tower. Therefore, for example, even when a lean amine cooler (not shown) cooling the lean absorbent is disposed downstream from the amine heat exchanger 36 in the lean supply channel 5 and the lean absorbent to be supplied to the absorption tower 2 is cooled in advance before being supplied to the absorption tower 2, it is possible to reduce the external heat loss to the outside which is caused by the cooling of the lean amine cooler.

In this embodiment, the heat of the decarbonated gas and the absorbent led from the absorption tower 2 is transmitted to the heat carrier medium in the decarbonated gas cooler 102, the cleaner cooler 103, and the rich amine heat exchanger 104. Therefore, the heat generated in the exothermic reaction in the absorption tower 2 can be transmitted to the heat carrier medium without providing the absorption-tower internal heat exchanger 37. Accordingly, for example, it is possible to simplify the carbon dioxide gas recovery device 100.

In this embodiment, the heat pump 6 does not include the absorption-tower internal heat exchanger 37, but may include the absorption-tower internal heat exchanger.

(Third Embodiment)

A carbon dioxide gas recovery device according to a third embodiment of the invention will be described below.

Figure 3:
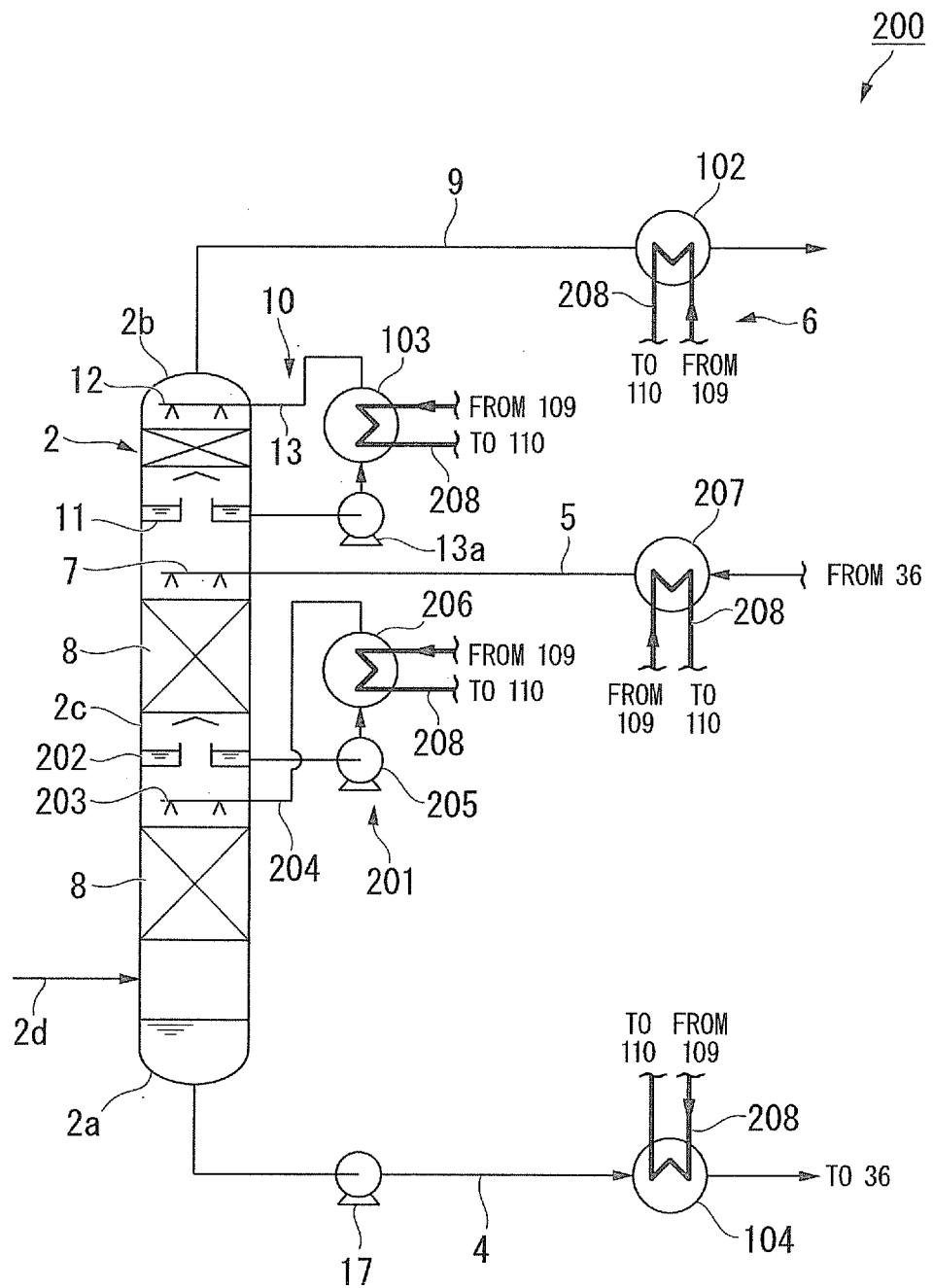
FIG. 3 is a diagram schematically illustrating a carbon dioxide gas recovery device according to a third embodiment of the invention.

In the third embodiment, the same elements as in the second embodiment are referenced by the same reference signs, description thereof will not be repeated, and only different points will be described. In FIG. 3, for the purpose of facilitating the understanding of the drawing, some of the same parts as the elements in the second embodiment are not shown.

As shown in FIG. 3, in the carbon dioxide gas recovery device 200 according to this embodiment, the absorption tower filler 8 is vertically divided into two parts and disposed in the tower intermediate part 2c of the absorption tower 2 and the absorption tower 2 is provided with an intercooler system 201 leading the absorbent from the tower intermediate part 2c of the absorption tower 2, cooling the led absorbent, and reintroducing the cooled absorbent into the tower intermediate part 2c.

The intercooler system 201 includes a liquid-receiving tray 202 being disposed between the divided absorption tower fillers 8 and storing the absorbent, a fifth nozzle 203 being disposed below the liquid-receiving tray 202 and supplying the absorbent to a downward direction, and a pipe 204 connecting the liquid-receiving tray 202 and the fifth nozzle 203.

The pipe 204 is provided with an intercooler pump 205 transferring the absorbent from the liquid-receiving tray 202 to the fifth nozzle 203 through the pipe 204.

In this embodiment, a heat carrier cooling type intercooler (the sixth heat exchanger) 206 exchanging heat between the absorbent and the heat carrier medium lowered in temperature through expansion is interposed between the intercooler system 201 and the heat pump 6. A heat carrier cooling type lean amine cooler (the seventh heat exchanger) 207 exchanging heat between the lean absorbent and the heat carrier medium lowered in temperature through expansion is interposed between the lean supply channel 5 and the heat pump 6.

In the example shown in the drawing, the heat pump 6 includes five branch pipes 208. The branch pipes 208 are provided with the decarbonated gas cooler 102, the cleaner cooler 103, the rich amine heat exchanger 104, the heat carrier cooling type intercooler 206, and the heat carrier cooling type lean amine cooler 207, respectively.

In the intercooler system 201, the heat carrier cooling type intercooler 206 is interposed between the intercooler pump 205 and the fifth nozzle 203 in the pipe 204.

In the lean supply channel 5, the heat carrier cooling type lean amine cooler 207 is disposed downstream from the amine heat exchanger 36.

The operation of the carbon dioxide gas recovery device 200 having the above-mentioned configuration will be described below. Here, the flow of the heat carrier medium of in the heat pump 6 will be described with the heat carrier expansion valve 41 as a start point and with the heat carrier collector 110 as an end point.

The heat carrier medium lowered in temperature by the heat carrier expansion valve 41 passes through the second pipe 108 and then passes through the five branch pipes 208 branched by the heat carrier distributor 109.

Among these, the heat carrier medium passing through the branch pipe 208 provided with the heat carrier cooling type intercooler 206 is heated while cooling the absorbent by exchanging heat with the absorbent in the heat carrier cooling type intercooler 206.

The heat carrier medium passing through the branch pipe 208 provided with the heat carrier cooling type lean amine cooler 207 is heated while cooling the lean absorbent in the heat carrier cooling type lean amine cooler 207.

The hear carriers passing through the branch pipes 208 are merged in the heat carrier collector 110.

As described above, in the carbon dioxide gas recovery device 200 according to this embodiment, the heat carrier cooling type lean amine cooler 207 is interposed between the lean supply channel 5 and the heat pump 6. Accordingly, by exchanging heat between the lean absorbent of the lean supply channel 5 and the heat carrier medium of the heat pump 6, it is possible to heat the heat carrier medium while cooling the lean absorbent.

Accordingly, the heat of the lean absorbent which was wasted through the use of cooling water in the past can be recovered as the heat of the heat carrier medium without being wasted. It is possible to cool the lean absorbent to be supplied to the absorption tower 2 and thus to promote the absorption of carbon dioxide gas in the absorbent in the absorption tower 2.

Since the intercooler system 201 is disposed in the absorption tower 2, it is possible to cool the absorbent of the tower intermediate part 2c and then reintroduce the cooled absorbent and thus to further promote the absorption of carbon dioxide gas by the absorbent in the absorption tower 2.

Since the heat carrier cooling type intercooler 206 is interposed between the intercooler system 201 and the heat pump 6, it is possible to heat the heat carrier medium while cooling the absorbent by exchanging heat between the absorbent of the intercooler system 201 and the heat carrier medium of the heat pump 6.

Accordingly, the heat generated in the exothermic reaction of the absorption tower 2 and exchanged with the absorbent can be prevented from leaking to the outside, thereby further achieving an energy-saving effect.

(Fourth Embodiment)

A carbon dioxide gas recovery device according to a fourth embodiment of the invention will be described below.

In the fourth embodiment, the same elements as in the first embodiment are referenced by the same reference signs, description thereof will not be repeated, and only different points will be described.

Figure 4:
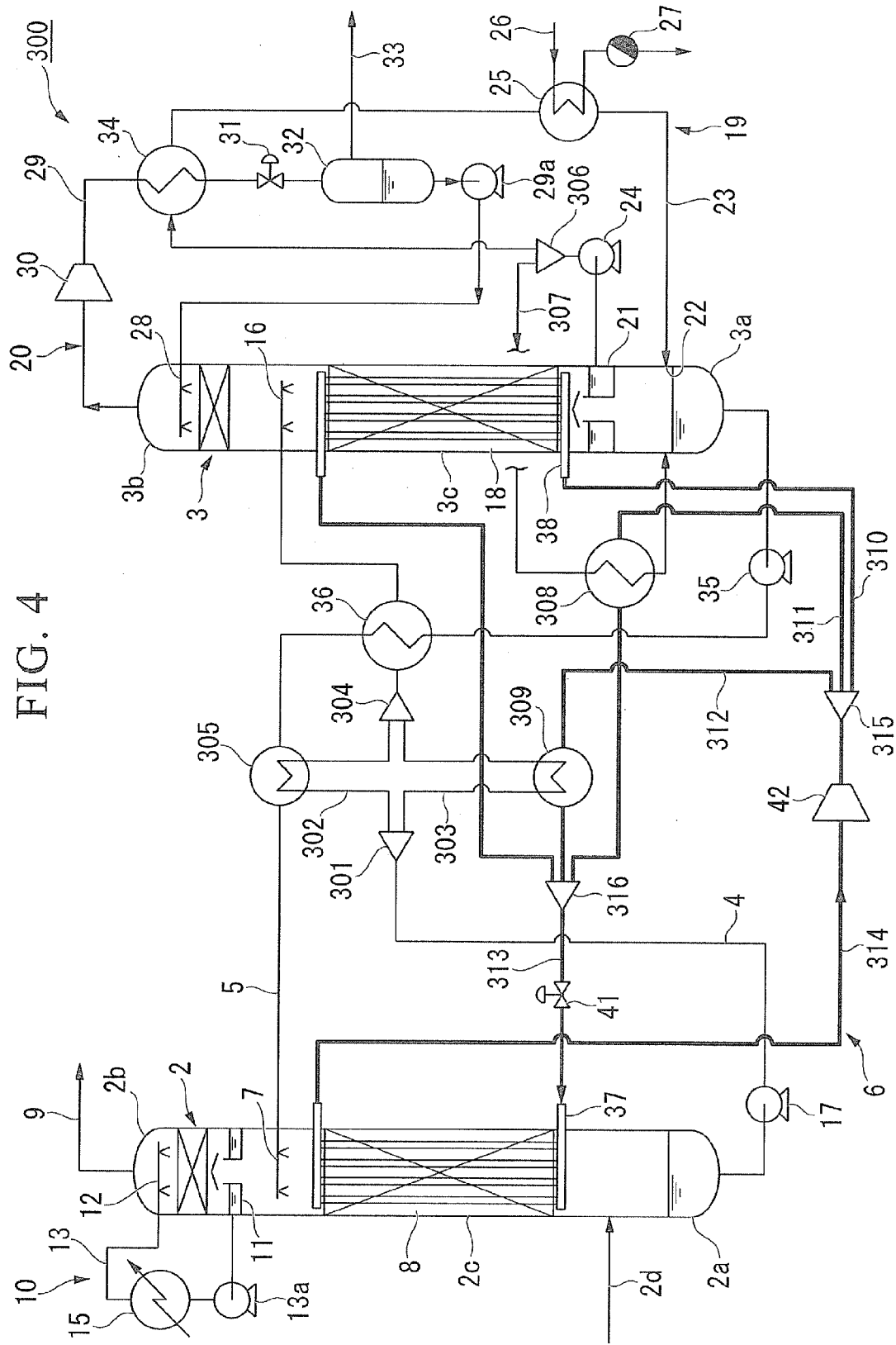
FIG. 4 is a diagram schematically illustrating a carbon dioxide gas recovery device according to a fourth embodiment of the invention.

As shown in FIG. 4, in the carbon dioxide gas recovery device 300 according to this embodiment, a rich amine distributor 301 branching the flow of a rich absorbent, two rich branch channels 302 and 303 through which the branched rich absorbents flow, and a rich amine collector 304 in which the rich branch channels 302 and 303 are merged are disposed in a part of the rich supply channel 4 located between the absorption tower bottom pump 17 and the amine heat exchanger 36.

A first rich amine heat exchanger 305 exchanging heat between the rich absorbent and the lean absorbent is interposed between one rich branch channel 302 of the two rich branch channels 302 and 303 and the lean supply channel 5. The first rich amine heat exchanger 305 is disposed downstream from the amine heat exchanger 36 in the lean supply channel 5. The first rich amine heat exchanger 305 exchanges heat between the rich absorbent of one rich branch channel 302 and the lean absorbent of the lean supply channel 5. Accordingly, it is possible to cool the lean absorbent being supplied to absorption tower 2 and causing an exothermic reaction in the absorption tower 2 while preliminarily heating the rich absorbent being supplied to the regeneration tower 3 and causing an endothermic reaction in the regeneration tower 3.

A reboiler distributor 306 is interposed between the reboiler pump 24 and the condensing heat exchanger 34 in the pipe 23 of the reboiler system 19 disposed in the regeneration tower 3. A branch pipe 307 connected to the tower bottom portion 3a of the regeneration tower 3 is branched from the reboiler distributor 306.

In this embodiment, a heat carrier type reboiler heater (the eighth heat exchanger) 308 exchanging heat between the absorbent and the heat carrier medium raised in temperature through compression is interposed between the reboiler system 19 and the heat pump 6. A second rich amine heat exchanger (the ninth heat exchanger) 309 exchanging heat between the rich absorbent and the heat carrier medium raised in temperature through compression is interposed between the rich supply channel 4 and the heat pump 6.

The heat carrier type reboiler heater 308, the second rich amine heat exchanger 309, and the regeneration-tower internal heat exchanger 38 are disposed on a heat supply side in which the heat carrier medium compressed to rise in temperature by the heat carrier compressor 42 passes and the heat carrier medium exchanges heat in the beat pump 6.

In the example shown in the drawing, the heat pump 6 includes plural pipes 310, 311, 312, 313, and 314 and a heat carrier distributor 315 and a heat carrier collector 316 connecting the pipes. The plural pipes 310, 311, 312, 313, and 314 include three branch pipes 310, 311, and 312 connecting the heat carrier distributor 315 and the heat carrier collector 316, a first pipe 313 connecting the heat carrier collector 316 and the bottom of the absorption-tower internal heat exchanger 37, and a second pipe 314 connecting the top of the absorption-tower internal heat exchanger 37 and the heat carrier distributor 315.

In an intermediate part of the first branch pipe 310 of the three branch pipes 310, 311, and 312 is provided with the regeneration-tower internal heat exchanger 38, the heat carrier type reboiler heater 308 is disposed in the second branch pipe 311, and the second rich amine heat exchanger 309 is disposed in the third branch pipe 312. The first pipe 313 is provided with the heat carrier expansion valve 41 and the second pipe 314 is provided with the heat carrier compressor 42.

In the example shown in the drawing, in the reboiler system 19, the heat carrier reboiler heater 308 is disposed in the branch pipe 307. In the rich supply channel 4, the second rich amine heat exchanger 309 is disposed in the other rich branch channel 303 other than one rich branch channel 302 of the two rich branch channels 302 and 303. The second rich amine heat exchanger 309 is disposed upstream from the amine heat exchanger 36 in the rich supply channel 4.

The operation of the carbon dioxide gas recovery device 300 having the above-mentioned configuration will be described below. Here, the flow of the heat carrier medium in the heat pump 6 will be described with the heat carrier expansion valve 41 as a start point.

The heat carrier medium lowered in temperature by the heat carrier expansion valve 41 passes through the first pipe 313, then receives the heat of the exothermic reaction while cooling the absorbent by exchanging heat with the absorbent while moving from the bottom to the top of the absorption-tower internal heat exchanger 37, and then moves the heat carrier distributor 315 through the second pipe 314. At this time, the temperature of the heat carrier medium is raised by the heat carrier compressor 42. The heat carrier medium is branched by the heat carrier distributor 315 and the branched heat carrier media pass through the branch pipes 310, 311, and 312, respectively.

Among these, the heat carrier medium passing through the first branch pipe 310 transmits the heat as the heat source of the endothermic reaction to the rich absorbent to heat the rich absorbent by exchanging heat with the absorbent while moving from the bottom to the top of the regeneration-tower internal heat exchanger 38.

The heat carrier medium passing through the second branch pipe 311 transmits the heat to the absorbent to heat the absorbent by exchanging heat with the absorbent of the reboiler system 19 in the heat carrier type reboiler heater 308.

The heat carrier medium passing through the third branch pipe 312 transmits the heat to the rich absorbent to heat the rich absorbent by exchanging heat with the rich absorbent of the rich supply channel 4.

The heat carrier media passing through the branch pipes 310, 311, and 312 are merged in the heat carrier collector 316. The heat carrier media merged in the heat carrier collector 316 move to the bottom of the absorption-tower internal heat exchanger 37 through the first pipe 313. At this time, the heat carrier medium is lowered in temperature again by the heat carrier expansion valve 41.

As described above, in the carbon dioxide gas recovery device 300 according to this embodiment, the heat carrier type reboiler heater 308 is interposed between the reboiler system 19 and the heat pump 6. Accordingly, by exchanging heat between the absorbent of the reboiler system 19 and the heat carrier medium of the heat pump 6, the heat of the heat carrier medium can be transmitted to the absorbent to heat the absorbent.

Accordingly, it is possible to further suppress the amount of heat input, which is input externally, to the reboiler system 19 and thus to further achieve an energy-saving effect.

Since the second rich amine heat exchanger 309 is interposed between the rich supply channel 4 and the heat pump 6, the heat of the heat carrier medium can be transmitted to the rich absorbent to be supplied to the regeneration tower 3 to heat the rich absorbent by exchanging heat between the rich absorbent of the rich supply channel 4 and the heat carrier medium of the heat pump 6.

In this way, since the rich absorbent to be supplied to the regeneration tower 3 can be preliminarily heated, it is possible to suppress the amount of heat to be transmitted to the rich absorbent in the regeneration tower 3. Accordingly, it is possible to further suppress the amount of heat input, which is input externally, to the reboiler system 19 and thus to further achieve an energy-saving effect.

As in this embodiment, when the amine heat exchanger 36 is interposed between the lean supply channel 5 and the rich supply channel 4, the amount of heat applied in the second amine heat exchanger 309 is added to the amount of heat applied in the amine heat exchanger 36 and thus the amount of heat preliminarily applied to the rich absorbent increases, thereby further suppressing the amount of heat to be applied to the absorbent by the reboiler system 19. Accordingly, it is possible to further suppress the amount of heat input, which is input externally, to the reboiler system 19 and thus to further achieve an energy-saving effect.

(Fifth Embodiment)

A carbon dioxide gas recovery device according to a fifth embodiment of the invention will be described below.

In the fifth embodiment, the same elements as in the second embodiment are referenced by the same reference signs, description thereof will not be repeated, and only different points will be described here.

Figure 5:
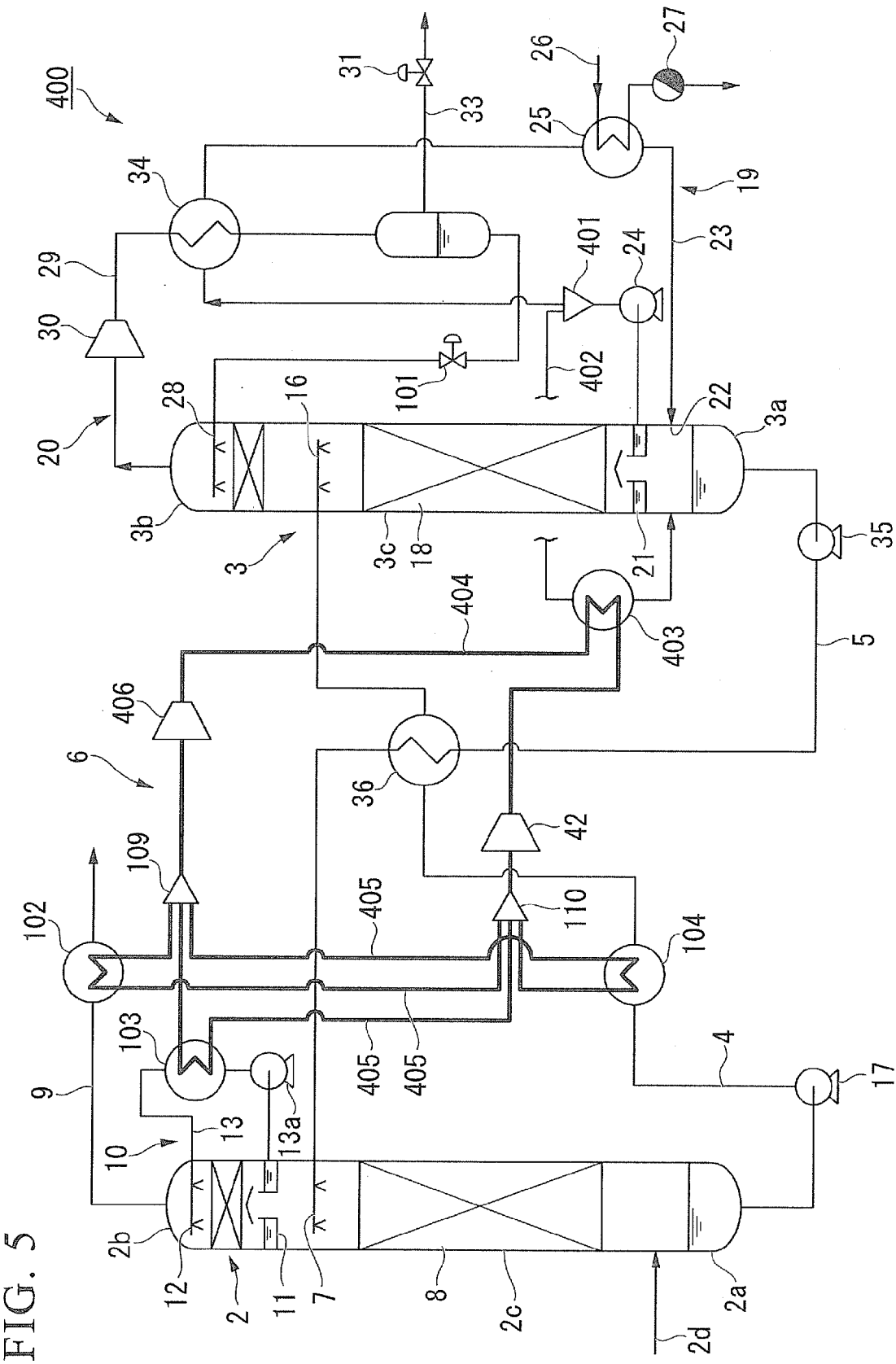
FIG. 5 is a diagram schematically illustrating a carbon dioxide gas recovery device according to a fifth embodiment of the invention.

As shown in FIG. 5, in the carbon dioxide gas recovery device 400 according to this embodiment, A reboiler distributor 401 is disposed between the reboiler pump 24 and the condensing heat exchanger 34 in the pipe 23 of the reboiler system 19 disposed in the regeneration tower 3. A branch pipe 402 connected to the tower bottom portion 3a of the regeneration tower 3 is branched from the reboiler distributor 401.

The heat pump 6 does not include the regeneration-tower internal heat exchanger 38. In this embodiment, a heat carrier type reboiler heater (the eighth heat exchanger) 403 exchanging heat between the absorbent and the heat carrier medium raised in temperature through compression is interposed between the reboiler system 19 and the heat pump 6.

In the example shown in the drawing, plural pipes 404 and 405 of the heat pump 6 includes a main pipe 404 connecting the heat carrier collector 110 and the heat carrier distributor 109 and including the heat carrier compressor 42 and three branch pipes 405 connecting the heat carrier distributor 109 and the heat carrier collector 110.

The main pipe 404 is provided with a heat carrier expansion turbine 406 lowering the temperature by expanding the heat carrier medium. The heat carrier expansion turbine 406 obtains rotary power when expanding the heat carrier medium. The heat carrier type reboiler heater 403 is interposed between the heat carrier compressor 42 and the heat carrier expansion turbine 406 in the main pipe 404.

At least one of heat carrier cooling type decarbonated gas cooler 102, the heat carrier cooling type cleaner cooler 103, and the heat carrier cooling type rich amine heat exchanger 104 are disposed in the branch pipes 405.

The operation of the carbon dioxide gas recovery device 400 having the above-mentioned configuration will be described below. Here, the flow of the heat carrier medium in the heat pump 6 will be described with the hear carrier expansion turbine 406 as a start point.

The heat carrier medium lowered in temperature by the heat carrier expansion turbine 406 passes through the main pipe 404 and then is branched by the heat carrier distributor 109 and the branched heat carrier media are heated by the heat exchangers while passing through the three branch pipes 405, respectively, and are then merged in the heat carrier collector 110. The hear carrier merged in the heat carrier collector 110 is raised in temperature by the heat carrier compressor 42 while passing through the main pipe 404 and transmits the heat of the heat carrier medium to the absorbent to heat the absorbent by exchanging heat with the absorbent of the reboiler system 19 in the heat carrier type reboiler heater 403. Thereafter, the heat carrier medium moves to the heat carrier distributor 109 through the main pipe 404. At this time, the heat carrier medium is lowered in temperature again by the heat carrier expansion turbine 406.

As described above, in the carbon dioxide gas recovery device 400 according to this embodiment, the heat carrier type reboiler heater 403 is interposed between the reboiler system 19 and the heat pump 6. Accordingly, by exchanging heat between the absorbent of the reboiler system 19 and the heat carrier medium of the heat pump 6, the heat of the heat carrier medium can be transmitted to the absorbent to heat the absorbent.

Accordingly, it is possible to further suppress the amount of heat input, which is input externally, to the reboiler system 19 and thus to further achieve an energy-saving effect.

It is stated above that the heat pump 6 does not include the regeneration-tower internal heat exchanger 38, but may include the regeneration-tower internal heat exchanger.

(Sixth Embodiment)

A carbon dioxide gas recovery device according to a sixth embodiment of the invention will be described below.

Figure 6:
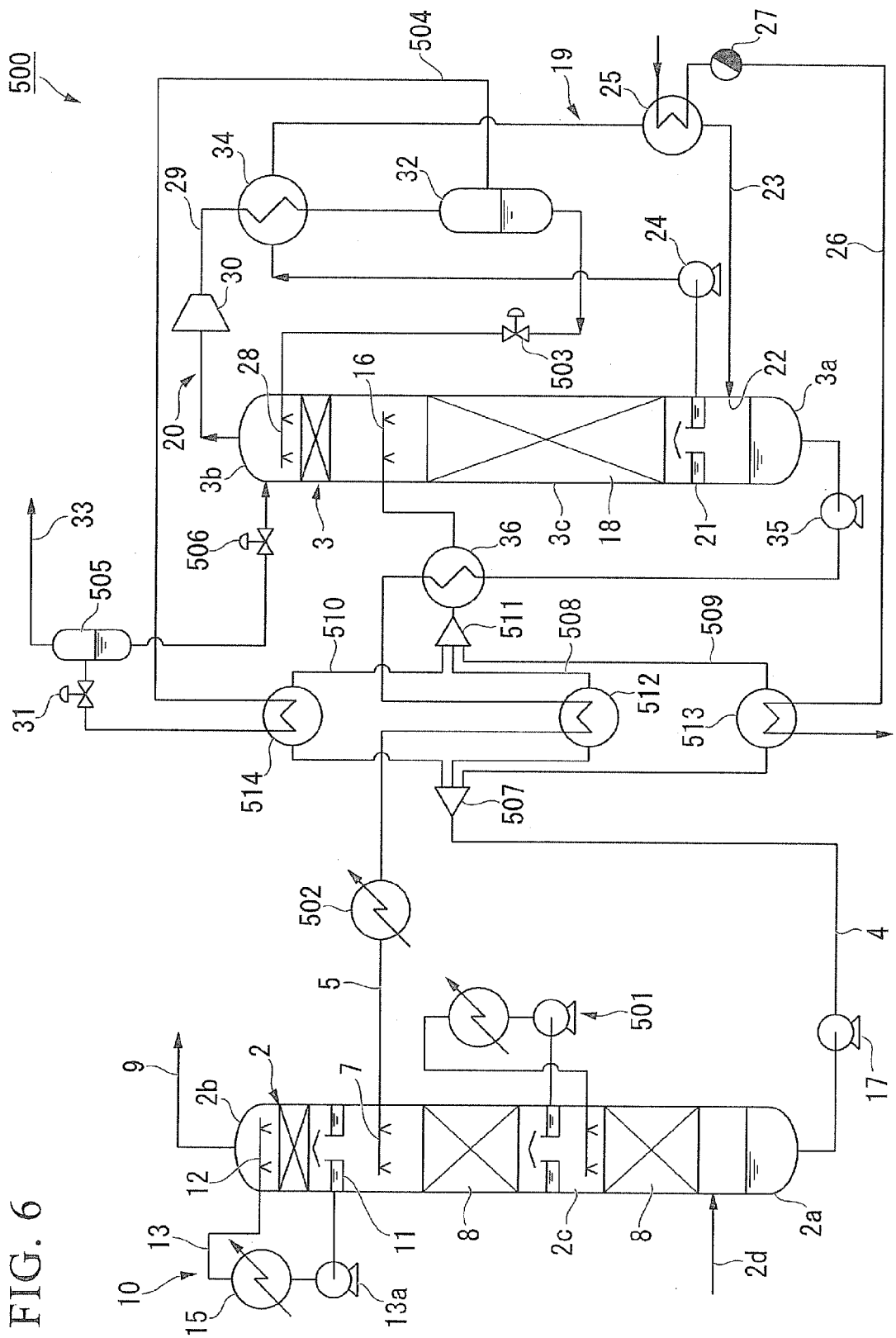
FIG. 6 is a diagram schematically illustrating a carbon dioxide gas recovery device according to a sixth embodiment of the invention.

In the sixth embodiment, the same elements as in the first embodiment are referenced by the same reference signs, description thereof will not be repeated, and only different points will be described. In FIG. 6, for the purpose of facilitating the understanding of the drawing, the heat pump 6 is not shown.

As shown in FIG. 6, in the carbon dioxide gas recovery device 500 according to this embodiment, the absorption tower filler 8 is vertically divided into two parts and disposed in the tower intermediate part 2c of the absorption tower 2 and the absorption tower 2 is provided with an intercooler system 501 leading the absorbent from the tower intermediate part 2c of the absorption tower 2, cooling the led absorbent, and reintroducing the cooled absorbent into the tower intermediate part 2c.

In the lean supply channel 5, a lean amine cooler 502 cooling the lean absorbent is disposed downstream from the amine heat exchanger 36.

The pipe 29 of the mixed gas cooling system 20 is not provided with the decompression and expansion valve 31. A level adjusting valve 503 instead of the condensate circulating pump 29a is disposed between the gas-liquid separator 32 and the fourth nozzle 28 in the pipe 29.

The gas-liquid separator 32 separates a condensate which is the vapor fraction of the solute and the solvent condensed by the condensing heat exchanger 34 and a non-condensed residual temperature-raised mixed gas including a non-condensed vapor fraction of the solute and the solvent and carbon dioxide gas. The gas-liquid separator 32 is provided with a residual gas flow channel 504 connected to the tower top portion 3b of the regeneration tower 3 through another gas-liquid separator 505 to be described later instead of the discharge channel 33.

The non-condensed residual temperature-raised mixed gas separated by the gas-liquid separator 32 passes through the residual gas flow channel 504. In the residual gas flow channel 504, a third rich amine heat exchanger (the eleventh heat exchanger) 514 to be described later, the decompression and expansion valve 31, the gas-liquid separator 505 separating the condensate of the vapor fraction of the solute and the solvent and the non-condensed carbon dioxide gas, and the level adjusting valve 506 are arranged in this order from the gas-liquid separator 32 to the tower top portion 3b of the regeneration tower 3.

The gas-liquid separator 505 is provided with the discharge channel 33.

A rich amine distributor 507 branching the flow of the rich absorbent, three rich branch channels 508, 509, and 510 in which the branched rich absorbents flow, and a rich amine collector 511 in which the rich branch channels 508, 509, and 510 are disposed in a part of the rich supply channel located in the rich supply channel 4 between the absorption tower bottom pump 17 and the amine heat exchanger 36.

A first rich amine heat exchanger 512 exchanging heat between the rich absorbent and the lean absorbent is interposed between the first rich branch channel 508 of the three rich branch channels 508, 509, and 510 and the lean supply channel 5. The first rich amine heat exchanger 512 is disposed downstream from the amine heat exchanger 36 in the lean supply channel 5.

A second rich amine heat exchanger 513 exchanging heat between the rich absorbent and a high-temperature fluid is interposed between the second rich branch channel 509 of the three rich branch channels 508, 509, and 510 and the reboiler pipe 26. The second rich amine heat exchanger 513 is disposed downstream from the steam trap 27 in the reboiler pipe 26.

In this embodiment, a third rich amine heat exchanger 514 exchanging heat between the temperature-raised mixed gas passing through the condensing heat exchanger 34 and the rich absorbent is interposed between the mixed gas cooling system 20 and the rich supply channel 4.

The third rich amine heat exchanger 514 is disposed in the third rich branch channel 510 of the three rich branch channel 508, 509, and 510 and is disposed upstream from the decompression and expansion valve 31 in the residual gas flow channel 504.

The operation of the carbon dioxide gas recovery device 500 having the above-mentioned configuration will be described below.

First, the flow of the rich absorbent in the rich supply channel 4 will be described.

The rich absorbent passing through the rich supply channel 4 reaches the rich amine distributor 507 and is then branched into three branch channels 508, 509, and 510.

Among these, the rich absorbent passing through the first rich branch channel 508 is heated while cooling the lean absorbent by exchanging heat with the lean absorbent of the lean supply channel 5 through the first rich amine heat exchanger 512.

The rich absorbent passing through the second rich branch channel 509 is heated by receiving the heat from the high-temperature fluid by exchanging heat with the high-temperature fluid of the reboiler pipe 26 through the second rich amine heat exchanger 513.

The rich absorbent passing through the third rich branch channel 510 is heated while cooling the residual temperature-raised mixed gas by exchanging heat with the residual temperature-raised mixed gas flowing through the residual flow channel 504 through the third rich amine heat exchanger 514.

The rich absorbents heated through the rich branch channels 508, 509, and 510 are merged in the rich amine collector 511 and the merged rich absorbent is then supplied to the third nozzle 16.

The flow of the mixed gas in the mixed gas cooling system 20 will be described below.

The mixed gas ascending in the regeneration tower 3 passes through the pipe 29 of the mixed gas cooling system 20 and is compressed to rise in temperature and to become temperature-raised mixed gas by the mixed gas compressor 30. Thereafter, by exchanging heat with the absorbent of the reboiler system 19 through the use of the condensing heat exchanger 34, the latent heat of the vapor fraction of the solute and the solvent is recovered and at least a part of the vapor fraction of the solute and the solvent is condensed into a condensate.

Then, the condensate and the non-condensed residual temperature-raised mixed gas are separated from each other through the use of the gas-liquid separator 32, and the condensate is supplied through the pipe 29 from the fourth nozzle 28 in the tower top portion 3b of the regeneration tower 3.

On the other hand, the non-condensed residual temperature-raised mixed gas passes through the residual gas flow channel 504 and the sensible heat of the gas and the latent heat of a part of the residual vapor fraction are recovered by exchanging heat with the rich absorbent passing through the third rich branch channel 510 through the use of the third rich amine heat exchanger 514. That is, the latent heat of the vapor fraction of the solute and the solvent is recovered with condensing the vapor fraction of the solute and the solvent in the residual temperature-raised mixed gas, and the sensible heat of carbon dioxide gas in the residual temperature-raised mixed gas. Thereafter, the residual temperature-raised mixed gas is expanded to fall in temperature by the decompression and expansion valve 31, whereby the vapor fraction of the solute and the solvent in the residual temperature-raised mixed gas is condensed into a condensate.

The condensate and the non-condensed carbon dioxide gas are separated by the gas-liquid separator 505. Among these, the condensate is supplied to the tower top portion 3b of the regeneration tower 3 through the residual gas flow channel 504 and carbon dioxide gas is discharged through the discharge channel 33.

As described above, in the carbon dioxide gas recovery device 500 according to this embodiment, the third rich amine heat exchanger 514 is interposed between the mixed gas cooling system 20 and the rich supply channel 4. Accordingly, by exchanging heat between the residual temperature-raised mixed gas of the mixed gas cooling system 20 and the rich absorbent of the rich supply channel 4, it is possible to cool the residual temperature-raised mixed gas while heating the rich absorbent to be supplied to the regeneration tower 3.

In this way, since the rich absorbent to be supplied to the regeneration tower 3 can be preliminarily heated with the amount of heat of the mixed gas flowing out from the regeneration tower 3, it is possible to suppress the amount of heat to be transmitted to the rich absorbent in the regeneration tower 3. Accordingly, it is possible to further suppress the amount of heat input, which is input externally, to the reboiler system 19 and thus to further achieve an energy-saving effect.

Since the temperature-raised mixed gas of the mixed gas cooling system 20 first passes through the condensing heat exchanger 34 and then passes through the third rich amine heat exchanger 514, the latent heat of the vapor fraction of the solute and the solvent in the temperature-raised mixed gas can be first recovered through the use of the condensing heat exchanger 34 and then the sensible heat of the residual temperature-raised mixed gas and the residual latent heat can be recovered through the use of the third rich amine heat exchanger 514.

Similarly to the first embodiment, the above-mentioned advantages can be generalized. In this embodiment, the following effect can be described in addition to (1) Self-Heat Recuperation Effect of Reaction Heat and (2) Self-Heat Recuperation of Latent Heat Required for Operating Tower.

(3) Self-Heat Recuperation of Sensible Heat Required for Operating Tower

The amount of sensible heat corresponding to the carbon dioxide included in the rich absorbent flowing in the regeneration tower 3 is equal to the amount of sensible heat of the residual temperature-raised mixed gas. Accordingly, when the temperature-raised mixed gas is obtained with a small amount of power for compressing the mixed gas and the sensible heat thereof is recovered by the third amine heat exchanger 514, the amount of preliminary heat of the rich absorbent to be introduced into the regeneration tower increases and the amount of heat to be externally supplied by the reboiler system 19 decreases. More strictly speaking, the amount of heat to be supplied is the sum of an amount of heat, which is obtained by subtracting the equivalent amount of sensible heat of carbon dioxide included in the rich absorbent from the amount of recovery leakage heat (the difference between the amount of sensible heat of the lean absorbent flowing out from the amine heat exchanger 36 and the amount of sensible heat of the rich absorbent flowing in the amine heat exchanger 36) in the amine heat exchanger 36, and an amount of heat matched with the amount of heat emitted from the circumference of the regeneration tower 3.

When the heat transfer area of the amine heat exchanger 36 is set to be great and the amount of recovery leakage heat in the amine heat exchanger 36 is brought close to zero, the amount of heat to be externally supplied by the reboiler system 19 is reduced to the amount of heat matched with the amount of heat emitted from the circumference of the regeneration tower 3. Since the amount of heat emitted can be controlled at the level of heat retention, the amount of heat to be externally supplied by the reboiler system 19 can be finally set to the vicinity of zero.

In this embodiment, the third rich amine heat exchanger 514 exchanges heat between the residual temperature-raised mixed gas of the mixed gas cooling system 20 and the rich absorbent of the rich supply channel 4, but the invention is not limited to this configuration. For example, the third rich amine heat exchanger 514 may exchange heat between carbon dioxide gas and the rich absorbent to recover the sensible heat of carbon dioxide gas.

In this case, for example, the mixed gas cooling system 20 may be configured to separate the total vapor fraction of the solute and the solvent in the temperature-raised mixed gas from carbon dioxide gas through the use of the gas-liquid separator 32 and to condense the total vapor fraction of the solute and the solvent in the temperature-raised mixed gas on the upstream side of the gas-liquid separator 32.

(Seventh Embodiment)

A carbon dioxide gas recovery device according to a seventh embodiment of the invention will be described below.

In the seventh embodiment, the same elements as in the first embodiment are referenced by the same reference signs, description thereof will not be repeated, and only different points will be described.

Figure 7:
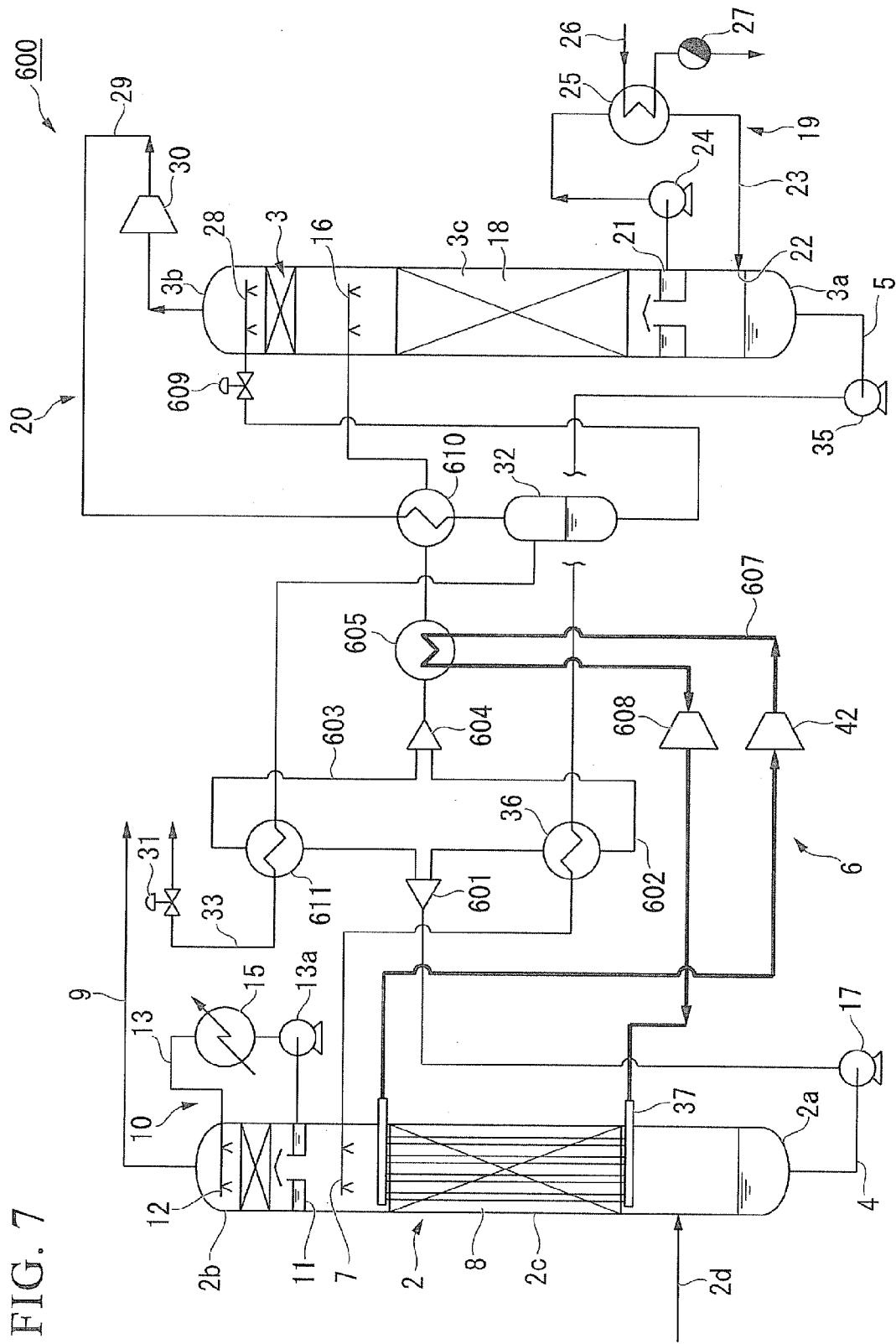
FIG. 7 is a diagram schematically illustrating a carbon dioxide gas recovery device according to a seventh embodiment of the invention.
Figure 8:
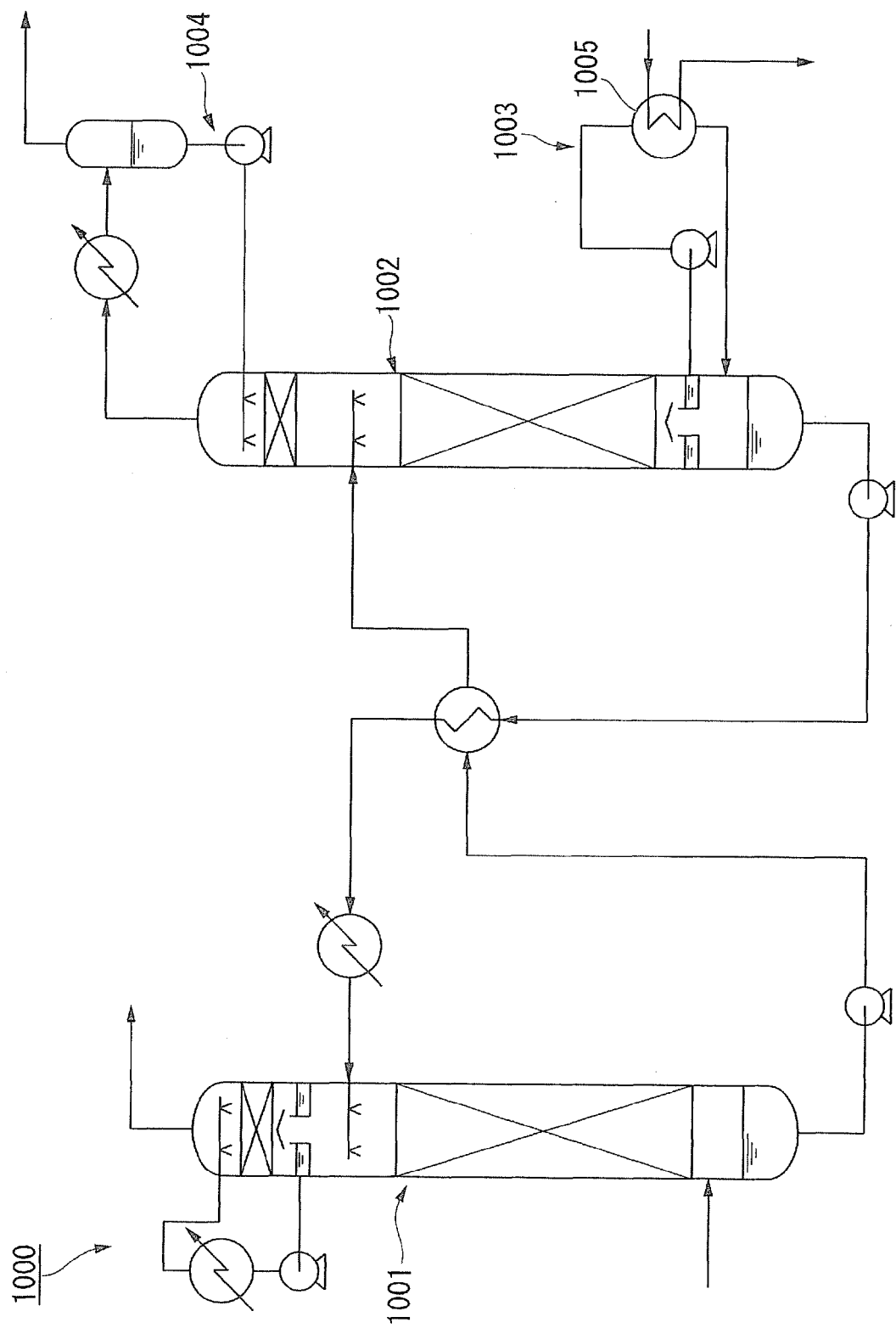
FIG. 8 is a diagram schematically illustrating a conventional carbon dioxide gas recovery device.

As shown in FIG. 7, in the carbon dioxide gas recovery device 600 according to this embodiment, a rich amine distributor 601 branching the flow of a rich absorbent, two rich branch channels 602 and 603 through which the branched rich absorbents flow, and a rich amine collector 604 in which the rich branch channels 602 and 603 are merged are disposed in a part of the rich supply channel 4 located downstream from the absorption tower bottom pump 17.

The amine heat exchanger 36 is interposed between one rich branch channel 602 of the two rich branch channels 602 and 603 and the lean supply channel 5.

The heat pump 6 does not include the regeneration-tower internal heat exchanger 38. In this embodiment, a first rich amine heat exchanger (the ninth heat exchanger) 605 exchanging heat between the rich absorbent and the heat carrier medium raised in temperature through compression is interposed between the rich supply channel 4 and the heat pump 6.

In the example shown in the drawing, the heat pump 6 includes a heat pump pipe 607 connecting the bottom and the top of the absorption-tower internal heat exchanger 37. The heat pump pipe 607 is provided with the heat carrier compressor 42 and a heat carrier expansion turbine 608 lowering the temperature of the heat carrier medium through expansion is disposed downstream from the heat carrier compressor 42 in the heat pump pipe 607. The heat carrier expansion turbine 608 obtains rotary power when expanding the heat carrier medium.

The first rich amine heat exchanger 605 is disposed downstream from the heat carrier compressor 42 and upstream from the heat carrier expansion turbine 608 in the heat pump pipe 607 and is disposed downstream from the rich amine collector 604 in the rich supply channel 4.

The decompression and expansion valve 31 of the mixed gas cooling system 20 is disposed in the discharge channel 33, and a level adjusting valve 609 instead of the condensate circulating pump 29a is disposed between the gas-liquid separator 32 and the fourth nozzle 28 in the pipe 29 of the mixed gas cooling system 20. In the example shown in the drawing, the condensing heat exchanger 34 is not provided.

In this embodiment, a second rich amine heat exchanger (the twelfth heat exchanger) 610 exchanging heat between the temperature-raised mixed gas and the rich absorbent is interposed between the mixed gas cooling system 20 and the rich supply channel 4. A third rich amine heat exchanger (the thirteenth heat exchanger) 611 exchanging heat between the temperature-raised mixed gas passed through the second rich amine heat exchanger 610 and the rich absorbent is interposed between the mixed gas cooling system 20 and the rich supply channel 4.

In the example shown in the drawing, the second rich amine heat exchanger 610 is disposed downstream from the mixed gas compressor 30 and upstream from the gas-liquid separator 32 in the pipe 29 of the mixed gas cooling system 20, and is disposed downstream from the first rich amine heat exchanger 605 in the rich supply channel 4.

The third rich amine heat exchanger 611 is disposed upstream from the decompression and expansion valve 31 in the discharge channel 33 of the mixed gas cooling system 20 and is disposed in the other rich branch channel 603 other than one rich branch channel 602 among two rich branch channels 602 and 603 in the rich supply channel 4.

The operation of the carbon dioxide gas recovery device 600 having the above-mentioned configuration will be described below.

The flow of the rich absorbent in the rich supply channel 4 will be described below.

The rich absorbent to pass through the rich supply channel 4 reaches the rich amine distributor 601 and is then branched into two rich branch channels 602 and 603.

Among these, the rich absorbent passing through one rich branch channel 602 is heated while cooling the lean absorbent by exchanging heat with the lean absorbent of the lean supply channel 5 through the use of the amine heat exchanger 36.

The rich absorbent passing through the other rich branch channel 603 is heated by receiving the heat from the carbon dioxide main gas by exchanging heat with the carbon dioxide main gas of the discharge channel 33 of the mixed gas cooling system 20 through the use of the third rich amine heat exchanger 611.

The rich absorbents heated through the rich branch channels 602 and 603 are merged in the rich amine collector 604 and the resultant rich absorbent is heated by receiving the heat from the heat carrier medium by exchanging heat with the heat carrier medium of the heat pump 6 through the use of the first rich amine heat exchanger 605. Thereafter, the rich absorbent is heated while cooling the temperature-raised mixed gas by exchanging heat with the temperature-raised mixed gas of the discharge channel 33 of the mixed gas cooling system 20 through the use of the second rich amine heat exchanger 610.

The rich absorbent heated in this way is then supplied to the third nozzle 16.

The flow of the mixed gas in the mixed gas cooling system 20 will be described below.

The mixed gas ascending in the regeneration tower 3 passes through the pipe 29 of the mixed gas cooling system 20 and is compressed to rise in temperature and to become a temperature-raised mixed gas by the mixed gas compressor 30. Thereafter, by exchanging heat with the rich absorbent of the rich supply channel 4 through the use of the second rich amine heat exchanger 610, the latent heat of the vapor fraction of the solute and the solvent is recovered and the vapor fraction of the solute and the solvent is condensed into a condensate.

Then, the condensate and the non-condensed carbon dioxide main gas having carbon dioxide gas as a main component are separated from each other through the use of the gas-liquid separator 32, and the condensate is supplied through the pipe 29 from the fourth nozzle 28 in the tower top portion 3b of the regeneration tower 3.

On the other hand, the non-condensed carbon dioxide gas passes through the discharge channel 33, exchanges heat with the rich absorbent passing through one rich branch channel 602 through the use of the third rich amine heat exchanger 611 to recover the sensible heat of the gas and the latent heat of a part of the residual vapor fraction, is expanded to fall in temperature through the use of the decompression and expansion valve 31, and is then discharged. At this time, the latent heat of the vapor fraction of the solute and the solvent is recovered with condensing the vapor fraction of the solute and the solvent in the carbon dioxide main gas, and the sensible heat of carbon dioxide gas in the carbon dioxide main gas is recovered.

The flow of the heat carrier medium in the heat pump 6 will be described below with the hear carrier expansion turbine 608 as a start point.

The heat carrier medium lowered in temperature by the heat carrier expansion turbine 608 passes through the heat pump pipe 607 and then receives the heat of the exothermic reaction while cooling the absorbent by exchanging heat with the absorbent while moving from the bottom to the top of the absorption-tower internal heat exchanger 37.

The heat carrier medium passes through the heat pump pipe 607, is compressed to rise in temperature by the heat carrier compressor 42, and is cooled while heating the rich absorbent by exchanging heat with the rich absorbent through the use of the first rich amine heat exchanger 605. Thereafter, the heat carrier medium passes through the heat pump pipe 607 and moves to the bottom of the absorption-tower internal heat exchanger 37. At this time, the heat carrier medium is lowered in temperature again by the heat carrier expansion turbine 608.

As described above, in the carbon dioxide gas recovery device 600 according to this embodiment, the mixed gas cooling system 20 includes the mixed gas compressor 30. Accordingly, the temperature-raised mixed gas is obtained without applying external heat by supplying a small amount of external power thereto. The second rich amine heat exchanger 610 is interposed between the mixed gas cooling system 20 and the rich supply channel 4. Accordingly, it is possible to cool the temperature-raised mixed gas while heating the rich absorbent to be supplied to the regeneration tower 3 with the amount of heat of the mixed gas flowing out from the regeneration tower 3 by exchanging heat between the temperature-raised mixed gas of the mixed gas cooling system 20 and the rich absorbent of the rich supply channel 4.

In this way, since the rich absorbent to be supplied to the regeneration tower 3 can be preliminarily heated, it is possible to suppress the amount of heat to be transmitted to the rich absorbent in the regeneration tower 3. Accordingly, it is possible to further suppress the amount of heat input, which is input externally, to the reboiler system 19 and thus to effectively achieve an energy-saving effect.

The second rich amine heat exchanger 610 and the third rich amine heat exchanger 611 are interposed between the mixed gas cooling system 20 and the rich supply channel 4. Accordingly, it is possible to effectively preliminarily heat the rich absorbent to be supplied to the regeneration tower 3 and to further suppress the amount of heat to be applied to the rich absorbent in the regeneration tower 3. Therefore, it is possible to further suppress the amount of heat input, which is input externally, to the reboiler system 19 and thus to further achieve an energy-saving effect.

The temperature-raised mixed gas of the mixed gas cooling system 20 passes through the second rich amine heat exchanger 610 and then passes through the third rich amine heat exchanger 611. Accordingly, for example, after the latent heat of the solute and the solvent in the temperature-raised mixed gas is recovered through the use of the second rich amine heat exchanger 610, the sensible heat of the non-condensed carbon dioxide main gas and the residual latent heat can be recovered through the use of the third rich amine heat exchanger 611.

Since the first rich amine heat exchanger 605 is interposed between the rich supply channel 4 and the heat pump 6, the heat of the heat carrier medium can be transmitted to the rich absorbent to be supplied to the regeneration tower 3 to heat the rich absorbent by exchanging heat between the rich absorbent of the rich supply channel 4 and the heat carrier medium of the heat pump 6.

In this way, since the rich absorbent to be supplied to the regeneration tower 3 can be preliminarily heated, it is possible to suppress the amount of heat to be transmitted to the rich absorbent in the regeneration tower 3. Accordingly, it is possible to further suppress the amount of heat input, which is input externally, to the reboiler system 19 and thus to further achieve an energy-saving effect.

As in this embodiment, when the amine heat exchanger 36 is interposed between the lean supply channel 5 and the rich supply channel 4, it is possible to reduce the amount of heat for heating the rich absorbent by the amine heat exchanger 36 and thus to further suppress the amount of heat to be applied to the absorbent by the reboiler system 19. Therefore, it is possible to further suppress the amount of heat input, which is input externally, to the reboiler system 19 and thus to further achieve an energy-saving effect.

In this embodiment, the heat pump 6 does not include the regeneration-tower internal heat exchanger 38, but it may include the regeneration-tower internal heat exchanger. In this embodiment, the condensing heat exchanger 34 is not provided, but it may be provided. In this embodiment, the heat pump includes the third rich amine heat exchanger 611, but it may not include it.

The technical scope of the invention is not limited to the above-mentioned embodiments, but may be modified in various forms without departing from the concept of the invention.

For example, in the above-mentioned embodiments, the temperature of the temperature-raised mixed gas is lowered in the mixed gas cooling system 20 by the use of the decompression and expansion valve 31, but an expansion turbine may be employed instead. In this case, rotary power can be obtained when expanding the temperature-raised mixed gas.

The first to sixth embodiments do not include the second rich amine heat exchanger 610 described in the seventh embodiment, but may include the second rich amine heat exchanger. The first to sixth embodiments include the condensing heat exchanger 34 and the seventh embodiment includes the second rich amine heat exchanger 610, but these elements may be removed.

The elements of the above-mentioned embodiments can be appropriately replaced with known elements and the above-mentioned modified examples may be appropriately combined, without departing from the concept of the invention.

INDUSTRIAL APPLICABILITY

The carbon dioxide gas recovery device according to the invention can suppress an amount of heat input, which is input externally, and achieve an energy-saving effect.

REFERENCE SIGNS LIST 1, 100, 200, 300, 400, 500, 600: CARBON DIOXIDE GAS RECOVERY DEVICE
2: ABSORPTION TOWER
2a: TOWER BOTTOM PORTION
2b: TOWER TOP PORTION
2c: TOWER INTERMEDIATE PART
3: REGENERATION TOWER
4: RICH SUPPLY CHANNEL
5: LEAN SUPPLY CHANNEL
6: HEAT PUMP
8: ABSORPTION TOWER FILLER
9: LEAD CHANNEL
10: DECARBONATED GAS CLEANING SYSTEM
18: REGENERATION TOWER FILLER
19: REBOILER SYSTEM
20: MIXED GAS COOLING SYSTEM
26: REBOILER PIPE
30: MIXED GAS COMPRESSOR (MIXED GAS COMPRESSOR)
34: CONDENSING HEAT EXCHANGER (TENTH HEAT EXCHANGER)
37: ABSORPTION-TOWER INTERNAL HEAT EXCHANGER (FIRST HEAT EXCHANGER)
38: REGENERATION-TOWER INTERNAL HEAT EXCHANGER (SECOND HEAT EXCHANGER)
102: DECARBONATED GAS COOLER (THIRD HEAT EXCHANGER)
103: CLEANER COOLER (FOURTH HEAT EXCHANGER)
104: RICH AMINE HEAT EXCHANGER (FIFTH HEAT EXCHANGER)
201, 501: INTERCOOLER SYSTEM
206: HEAT CARRIER COOLING INTERCOOLER (SIXTH HEAT EXCHANGER)
207: HEAT CARRIER COOLING LEAN AMINE COOLER (SEVENTH HEAT EXCHANGER)
308, 403: HEAT-CARRIER REBOILER HEATER (EIGHTH HEAT EXCHANGER)
309: SECOND RICH AMINE HEAT EXCHANGER (NINTH HEAT EXCHANGER)
514: THIRD RICH AMINE HEAT EXCHANGER (ELEVENTH HEAT EXCHANGER)
605: FIRST RICH AMINE HEAT EXCHANGER (NINTH HEAT EXCHANGER)
610: SECOND RICH AMINE HEAT EXCHANGER (TWELFTH HEAT EXCHANGER)
611: THIRD RICH AMINE HEAT EXCHANGER (THIRTEENTH HEAT EXCHANGER)

The invention claimed is:

1. A carbon dioxide gas recovery device comprising:
an absorption tower configured to bring a carbon dioxide-containing gas containing carbon dioxide gas into contact with a lean absorbent, and cause the lean absorbent to absorb carbon dioxide gas in the carbon dioxide-containing gas to generate a rich absorbent;
a regeneration tower configured to regenerate the lean absorbent by heating the rich absorbent supplied from the absorption tower to separate carbon dioxide gas from the rich absorbent,
a rich supply channel configured to lead the rich absorbent from a bottom portion of the absorption tower and supply the rich absorbent to a top portion of the regeneration tower;
a lean supply channel configured to lead the lean absorbent from a bottom portion of the regeneration tower and supply the lean absorbent to a top portion of the absorption tower; and
a heat pump configured to use the heat, which is transmitted through a heat carrier medium generated in an exothermic reaction in which the lean absorbent absorbs carbon dioxide gas in the absorption tower, as a heat source of an endothermic reaction in which carbon dioxide gas is separated from the rich absorbent in the regeneration tower,
wherein the absorption tower includes:
first and second fillers disposed in the absorption tower and configured to promote the absorption of carbon dioxide gas into the lean absorbent, the second filler being positioned at the lower side of the first filler in the absorption tower;
an introduction channel connected to the bottom portion of the absorption tower and configured to introduce the carbon dioxide-containing gas to the absorption tower;
a first nozzle connected to the lean supply channel in the top portion of the absorption tower and configured to supply the lean absorbent to the first filler inside the absorption tower; and
an intercooler system configured to lead the lean absorbent from a tower intermediate part of the absorption tower between the top portion and the bottom portion of the absorption tower, cool the led lean absorbent and reintroduce the cooled lean absorbent into the tower intermediate part, wherein the intercooler system includes:
a liquid-receiving tray disposed between the first and second fillers at the tower intermediate part of the absorption tower and configured to store the lean absorbent;
a fifth nozzle disposed below the liquid-receiving tray at the tower intermediate part of the absorption tower;
a pipe connecting the liquid-receiving tray and the fifth nozzle; and
a pump configured to transfer the lean absorbent from the liquid-receiving tray to the fifth nozzle through the pipe and supply the lean absorbent from the fifth nozzle to the second filler inside the absorption tower,
wherein the heat pump includes:
a second heat exchanger disposed in the regeneration tower and configured to exchange heat between the heat carrier medium and the rich absorbent in the regeneration tower;
a heat carrier expansion valve configured to expand the heat carrier medium of which heat has been exchanged with the rich absorbent in the second heat exchanger thereby lowering the temperature of the heat carrier medium;
a sixth heat exchanger disposed in the pipe of the intercooler system and configured to exchange heat between the heat carrier medium expanded by the heat carrier expansion valve and the lean absorbent received by the liquid-receiving tray,
a seventh heat exchanger disposed in the lean supply channel and configured to exchange heat between the heat carrier medium expanded by the expansion valve and the lean absorbent, and
a heat carrier compressor configured to compress the heat carrier medium of which heat has been exchanged with the lean absorbent in the sixth and seventh heat exchangers thereby raising the temperature of the heat carrier medium.

2. The carbon dioxide gas recovery device according to claim 1, wherein the heat pump includes a first heat exchanger that is embedded in an absorption tower filler disposed in the absorption tower, and is configured to exchange heat between the heat carrier medium lowered in temperature through expansion and the absorbent in the absorption tower.

3. The carbon dioxide gas recovery device according to claim 1, wherein the absorption tower includes a decarbonated gas cleaning system that is configured to lead a cleaner stored in the tower top portion of the absorption tower from the absorption tower, cool the led cleaner, and reintroduce the cooled cleaner into the tower top portion of the absorption tower, and
wherein a fourth heat exchanger that exchanges heat between the cleaner and the heat carrier medium lowered in temperature through expansion is interposed between the decarbonated gas cleaning system and the heat pump.

4. The carbon dioxide gas recovery device according to claim 1, further comprising a rich supply channel that is configured to supply the rich absorbent from the absorption tower to the regeneration tower,
wherein a fifth heat exchanger that exchanges heat between the rich absorbent and the heat carrier medium lowered in temperature through expansion is interposed between the rich supply channel and the heat pump.

5. The carbon dioxide gas recovery device according to claim 1, wherein an eighth heat exchanger that exchanges heat between the absorbent and the heat carrier medium raised in temperature through compression is interposed between the reboiler system and the heat pump.

6. The carbon dioxide gas recovery device according to claim 1, further comprising a rich supply channel that is configured to supply the rich absorbent from the absorption tower to the regeneration tower,
wherein a ninth heat exchanger that exchanges heat between the rich absorbent and the heat carrier medium raised in temperature through compression is interposed between the rich supply channel and the heat pump.

7. The carbon dioxide gas recovery device according to claim 1, wherein the mixed gas cooling system includes a mixed gas compressor that is configured to compress the mixed gas to raise the temperature of the mixed gas and obtain a temperature-raised mixed gas, and
wherein a tenth heat exchanger that exchanges heat between the absorbent and the temperature-raised mixed gas is interposed between the reboiler system and the mixed gas cooling system.

8. The carbon dioxide gas recovery device according to claim 7, further comprising a rich supply channel that is configured to supply the rich absorbent from the absorption tower to the regeneration tower,
wherein an eleventh heat exchanger that exchanges heat between the temperature-raised mixed gas after passing through the tenth heat exchanger and the rich absorbent is interposed between the mixed gas cooling system and the rich supply channel.

9. The carbon dioxide gas recovery device according to claim 1, further comprising a rich supply channel that is configured to supply the rich absorbent from the absorption tower to the regeneration tower,
wherein the mixed gas cooling system includes a mixed gas compressor that is configured to compress the mixed gas to raise the temperature of the mixed gas and obtain a temperature-raised mixed gas, and
wherein a twelfth heat exchanger that exchanges heat between the temperature-raised mixed gas and the rich absorbent is interposed between the mixed gas cooling system and the rich supply channel.

10. The carbon dioxide gas recovery device according to claim 9, wherein a thirteenth heat exchanger that exchanges heat between the temperature-raised mixed gas after passing through the twelfth heat exchanger and the rich absorbent is interposed between the mixed gas cooling system and the rich supply channel.

11. The carbon dioxide gas recovery device according to claim 2, wherein the heat pump includes a second heat exchanger that is embedded in a regeneration tower filler disposed in the regeneration tower, and is configured to exchange heat between the heat carrier medium raised in temperature through compression and the rich absorbent in the regeneration tower.

* * * * *